United States Patent
Wang et al.

(10) Patent No.: US 12,085,387 B1
(45) Date of Patent: Sep. 10, 2024

(54) OPTICAL COHERENCE TOMOGRAPHY SYSTEM FOR SUBSURFACE INSPECTION

(71) Applicants: HAMAMATSU PHOTONICS K.K., Shizuoka (JP); ENERGETIQ TECHNOLOGY, INC., Wilmington, MA (US)

(72) Inventors: Qingsong Wang, Lexington, MA (US); Shaival Vipul Buch, Watertown, MA (US); Huiling Zhu, Lexington, MA (US)

(73) Assignees: HAMAMATSU PHOTONICS K.K., Shizuoka (JP); ENERGETIQ TECHNOLOGY, INC., Wilmington, MA (US)

( * ) Notice: Subject to any disclaimer, the term of this patent is extended or adjusted under 35 U.S.C. 154(b) by 0 days.

(21) Appl. No.: 18/473,224

(22) Filed: Sep. 23, 2023

(51) Int. Cl.
*G01B 9/02091* (2022.01)
*G01B 9/02* (2022.01)
(Continued)

(52) U.S. Cl.
CPC ..... *G01B 9/02091* (2013.01); *G01B 9/02044* (2013.01); *G01B 9/0207* (2013.01); *G01N 21/4795* (2013.01)

(58) Field of Classification Search
CPC ............ G01B 9/02044; G01B 9/02057; G01B 9/0207; G01B 9/02091
See application file for complete search history.

(56) References Cited

U.S. PATENT DOCUMENTS

| 5,212,743 A | 5/1993 | Heismann |
| 5,321,501 A | 6/1994 | Swanson et al. |

(Continued)

FOREIGN PATENT DOCUMENTS

| CN | 101165471 A | 4/2008 |
| EP | 0981733 B1 | 2/2004 |

(Continued)

OTHER PUBLICATIONS

Na et al., "Efficient Broadband silicon-on-insulator grating coupler with low backreflection", Optics Letters, vol. 36, No. 11, Jun. 1, 2011, pp. 2101-2103.
(Continued)

*Primary Examiner* — Michael A Lyons
(74) *Attorney, Agent, or Firm* — Rauschenbach Patent Law Group, PLLC; Kurt Rauschenbach

(57) ABSTRACT

An OCT system includes a broadband light source and illumination optics that projects the generated broadband light to a sample where the light is scattered from within the sample in a direction that is normal to a surface of the sample to form a sample beam and is reflected from a top surface of the sample in a direction that is normal to the surface of the sample to form a reference beam where the sample beam and reference beam co-propagate. Collection optics collect light in the sample and reference beams and project the light to an interferometric combiner. The interferometric combiner is configured to interferometrically the collected light from the sample beam and collected light from the reference beam and to project the interferometrically combined light to a spectrometer that generates spectral interferometric information to determine information about the sample.

29 Claims, 5 Drawing Sheets

(51) Int. Cl.
  *G01B 9/02055* (2022.01)
  *G01N 21/47* (2006.01)

(56) References Cited

U.S. PATENT DOCUMENTS

| | | |
|---|---|---|
| 5,333,000 A | 7/1994 | Hietala et al. |
| 5,459,570 A | 10/1995 | Swanson et al. |
| 5,465,147 A | 11/1995 | Swanson |
| 5,905,572 A | 5/1999 | Li |
| 5,956,355 A | 9/1999 | Swanson et al. |
| 6,134,003 A | 10/2000 | Tearney et al. |
| 6,160,826 A | 12/2000 | Swanson et al. |
| 6,191,862 B1 | 2/2001 | Swanson et al. |
| 6,201,638 B1 | 3/2001 | Hall et al. |
| 6,288,784 B1 | 9/2001 | Hitzenberger et al. |
| 6,445,939 B1 | 9/2002 | Swanson et al. |
| 6,485,413 B1 | 11/2002 | Boppart et al. |
| 6,501,551 B1 | 12/2002 | Tearney et al. |
| 6,564,087 B1 | 5/2003 | Pitris et al. |
| 6,816,515 B1 | 11/2004 | Yun et al. |
| 6,845,108 B1 | 1/2005 | Liu et al. |
| 6,891,984 B2 | 5/2005 | Peterson et al. |
| 6,901,087 B1 | 5/2005 | Richardson et al. |
| 6,940,878 B2 | 9/2005 | Orenstein et al. |
| 7,061,618 B2 | 6/2006 | Atia et al. |
| 7,230,963 B2 | 6/2007 | Menon et al. |
| 7,447,408 B2 | 11/2008 | Bouma et al. |
| 7,488,930 B2 | 2/2009 | Ajgaonkar et al. |
| 7,530,948 B2 | 5/2009 | Seibel et al. |
| 7,623,907 B2 | 11/2009 | Takaoka et al. |
| 7,643,153 B2 | 1/2010 | De Boer et al. |
| 7,724,991 B1 | 5/2010 | Doerr |
| 7,747,114 B2 | 6/2010 | Peters et al. |
| 7,751,658 B2 | 7/2010 | Welch et al. |
| 7,843,572 B2 | 11/2010 | Tearney et al. |
| 7,864,822 B2 | 1/2011 | Bouma et al. |
| 7,916,387 B2 | 3/2011 | Schmitt |
| 8,041,161 B1 | 10/2011 | Lane et al. |
| 8,078,245 B2 | 12/2011 | Daly et al. |
| 8,384,909 B2 | 2/2013 | Yun et al. |
| 8,416,818 B2 | 4/2013 | Bouma et al. |
| 8,437,007 B2 | 5/2013 | Flanders |
| 8,515,221 B2 | 8/2013 | Flanders et al. |
| 8,614,795 B2 | 12/2013 | Duncan et al. |
| 8,690,330 B2 | 4/2014 | Hacker et al. |
| 8,711,364 B2 | 4/2014 | Brennan et al. |
| 8,854,629 B2 | 10/2014 | Frisken et al. |
| 8,885,679 B1 | 11/2014 | Roth et al. |
| 8,947,648 B2 | 2/2015 | Swanson et al. |
| 8,994,954 B2 | 3/2015 | Atia et al. |
| 9,008,142 B2 | 4/2015 | Minneman et al. |
| 9,044,164 B2 | 6/2015 | Hacker et al. |
| 9,122,016 B2 | 9/2015 | Takaoka et al. |
| 9,162,404 B2 | 10/2015 | Doerr |
| 9,356,419 B1 | 5/2016 | Orcutt |
| 9,400,169 B2 | 7/2016 | Zhou |
| 9,464,883 B2 | 10/2016 | Swanson et al. |
| 9,683,928 B2 | 6/2017 | Swanson et al. |
| 9,754,985 B1 | 9/2017 | Duncan et al. |
| 10,045,692 B2 | 8/2018 | Tumlinson et al. |
| 10,107,616 B2 | 10/2018 | Zhou |
| 10,126,572 B2 | 11/2018 | Zhang et al. |
| 10,132,610 B2 | 11/2018 | Swanson et al. |
| 10,191,145 B2 | 1/2019 | Swanson |
| 10,401,883 B2 | 9/2019 | Swanson et al. |
| 10,416,288 B2 | 9/2019 | Swanson |
| 10,422,623 B2 | 9/2019 | Swanson et al. |
| 10,876,827 B2 | 12/2020 | Swanson et al. |
| 10,895,525 B2 | 1/2021 | Swanson et al. |
| 10,907,951 B2 | 2/2021 | Avci |
| 10,969,571 B2 | 4/2021 | Swanson |
| 11,243,346 B2 | 2/2022 | Swanson |
| 11,397,075 B2 | 7/2022 | Swanson |
| 11,579,356 B2 | 2/2023 | Swanson |
| 2002/0015155 A1 | 2/2002 | Pechstedt et al. |
| 2002/0160543 A1 | 10/2002 | Liu et al. |
| 2002/0196817 A1 | 12/2002 | Little |
| 2003/0007719 A1 | 1/2003 | Forrest et al. |
| 2003/0223673 A1 | 12/2003 | Garito et al. |
| 2004/0052276 A1 | 3/2004 | Lou et al. |
| 2004/0064022 A1 | 4/2004 | Korn |
| 2004/0141676 A1 | 7/2004 | Bugaud et al. |
| 2005/0249509 A1 | 11/2005 | Nagarajan et al. |
| 2006/0058683 A1 | 3/2006 | Chance |
| 2006/0132790 A1 | 6/2006 | Gutin |
| 2006/0182156 A1 | 8/2006 | Owen et al. |
| 2006/0187537 A1 | 8/2006 | Huber et al. |
| 2007/0165682 A1 | 7/2007 | He et al. |
| 2007/0280310 A1 | 12/2007 | Muenter et al. |
| 2008/0165366 A1 | 7/2008 | Schmitt |
| 2008/0198367 A1 | 8/2008 | Chang et al. |
| 2008/0267241 A1 | 10/2008 | Brown et al. |
| 2008/0304074 A1 | 12/2008 | Brennan, III |
| 2010/0007894 A1* | 1/2010 | Suehira ............... G01B 11/0625 356/497 |
| 2010/0054761 A1 | 3/2010 | Chen et al. |
| 2010/0074632 A1 | 3/2010 | Zhou |
| 2010/0118292 A1 | 5/2010 | Park et al. |
| 2010/0178056 A1 | 7/2010 | Liu |
| 2010/0280321 A1* | 11/2010 | Modell ............... A61B 5/0066 600/160 |
| 2011/0109898 A1 | 5/2011 | Froggatt et al. |
| 2011/0128532 A1 | 6/2011 | Taira |
| 2011/0218404 A1 | 9/2011 | Hirakawa |
| 2011/0279821 A1 | 11/2011 | Brennan et al. |
| 2011/0285996 A1* | 11/2011 | Wang ............... G01B 9/02044 356/369 |
| 2012/0002971 A1 | 1/2012 | Doerr |
| 2012/0026503 A1 | 2/2012 | Lewandowski et al. |
| 2012/0075639 A1 | 3/2012 | Brennan et al. |
| 2012/0099112 A1 | 4/2012 | Alphonse et al. |
| 2012/0120407 A1 | 5/2012 | Frisken et al. |
| 2012/0156802 A1 | 6/2012 | Flagan et al. |
| 2012/0162659 A1 | 6/2012 | Goldberg et al. |
| 2012/0170046 A1 | 7/2012 | Flanders |
| 2012/0224165 A1 | 9/2012 | Swanson |
| 2012/0226118 A1 | 9/2012 | Delbeke et al. |
| 2012/0236883 A1 | 9/2012 | Adler |
| 2012/0237153 A1 | 9/2012 | Weimann et al. |
| 2012/0250007 A1 | 10/2012 | Na et al. |
| 2012/0286136 A1 | 11/2012 | Krill et al. |
| 2012/0321325 A1 | 12/2012 | Greshishchev et al. |
| 2013/0010283 A1 | 1/2013 | Villiger et al. |
| 2013/0044974 A1 | 2/2013 | Doerr |
| 2013/0062514 A1 | 3/2013 | Csutak |
| 2013/0084074 A1 | 4/2013 | Vawter et al. |
| 2013/0100456 A1 | 4/2013 | Yu et al. |
| 2013/0188971 A1 | 7/2013 | Painchaud |
| 2013/0209022 A1 | 8/2013 | Doerr |
| 2013/0230312 A1 | 9/2013 | Randel et al. |
| 2013/0236172 A1 | 9/2013 | Suzuki et al. |
| 2013/0308662 A1 | 11/2013 | Frisken et al. |
| 2013/0322892 A1 | 12/2013 | Aflatouni et al. |
| 2014/0016182 A1 | 1/2014 | Hotta |
| 2014/0028997 A1 | 1/2014 | Cable et al. |
| 2014/0050233 A1 | 2/2014 | Yu et al. |
| 2014/0072006 A1 | 3/2014 | Sandstrom |
| 2014/0125983 A1 | 5/2014 | Nitkowski et al. |
| 2014/0126902 A1 | 5/2014 | Swanson |
| 2014/0126990 A1 | 5/2014 | Swanson |
| 2014/0147079 A1 | 5/2014 | Doerr et al. |
| 2014/0160488 A1 | 6/2014 | Zhou |
| 2014/0203175 A1 | 7/2014 | Kobrinsky et al. |
| 2014/0233016 A1* | 8/2014 | Aiyer ............... G01B 9/02091 356/497 |
| 2014/0235948 A1 | 8/2014 | Mahalati et al. |
| 2014/0376000 A1 | 9/2014 | Swanson |
| 2014/0376001 A1 | 12/2014 | Swanson |
| 2015/0146750 A1 | 5/2015 | Miller |
| 2015/0333475 A1 | 11/2015 | Blumenthal |
| 2016/0231101 A1 | 8/2016 | Swanson et al. |
| 2016/0035700 A1 | 12/2016 | Swanson |
| 2016/0357007 A1 | 12/2016 | Swanson |
| 2017/0052015 A1 | 2/2017 | Swanson et al. |

(56) References Cited

U.S. PATENT DOCUMENTS

| | | | |
|---|---|---|---|
| 2017/0143196 A1 | 5/2017 | Liang et al. |
| 2017/0184450 A1 | 6/2017 | Doylend et al. |
| 2017/0205253 A1 | 7/2017 | Handerek |
| 2017/0268987 A1 | 9/2017 | Swanson |
| 2017/0268988 A1 | 9/2017 | Swanson |
| 2017/0299500 A1 | 10/2017 | Swanson |
| 2017/0299697 A1 | 10/2017 | Swanson |
| 2018/0066931 A1 | 3/2018 | Swanson et al. |
| 2020/0149865 A1 | 5/2020 | Swanson et al. |
| 2021/0063302 A1 | 3/2021 | Swanson |
| 2021/0088438 A1 | 3/2021 | Swanson |
| 2021/0278196 A1 | 9/2021 | Swanson |
| 2022/0137288 A1 | 5/2022 | Swanson |
| 2023/0363639 A1* | 11/2023 | Preciado | G01B 9/02083 |

FOREIGN PATENT DOCUMENTS

| | | |
|---|---|---|
| EP | 0883793 B1 | 11/2007 |
| EP | 1839375 B1 | 6/2014 |
| WO | 2004/073123 A1 | 8/2004 |
| WO | 2012/088361 A2 | 6/2012 |
| WO | 2013/101184 A1 | 7/2013 |
| WO | 2014/088650 A1 | 6/2014 |
| WO | 2014/089504 A1 | 6/2014 |

OTHER PUBLICATIONS

Nadkarni et al.,"Measurement of Collagen and Smooth Muscle Cell Content in Atherosclerotic Plaques using Polarization-Sensitive Optical Coherence Tomography", J. Am. Coll. Cardiol., vol. 49, No. 13, 2007, pp. 1474-1481.

Nagarajan et al.,"10 Channel, 100Gbit/s per Channel, Dual Polarization, Coherent QPSK, Monolithic InP Receiver Photonic Integrated Circuit", Optical Fiber Communication Conference Proceedings, 2011, OML7, pp. 03.

Nasiri et al., Resolution limits for imaging through multi-mode fiber, Optics Express, Jan. 2013, vol. 21, No. 1.

Neill et al.,"Compact polarization diverse receiver for biomedical imaging Applications", SPIE Proceedings, vol. 7891, 2011, pp. 78910Q-1-78910Q-5.

N'Gom et al.,"Mode Control in a Multimode Fiber Through Acquiring its Transmission Matrix from a Reference-less Optical System." ArXiv, 2017.

Nguyen et al.,"Integrated-optics-based swept-source optical coherence tomography," Opt. Lett., vol. 37, No. 23, 2012, pp. 4820-4822.

Nguyen et al.,"SiON integrated optics elliptic couplers for Fizeau-based optical coherence tomography", IEEE J. Lightw. Technol., vol. 28, No. 19, 2010, pp. 2836-2842.

Nguyen et al.,"Spectral domain optical coherence tomography imaging with an integrated optics spectrometer," Opt. Lett., vol. 36, 2011, pp. 1293-1295.

Nitkowski et al.,"Nano Spectrometer for Optical Coherence Tomography", Imaging and Applied Optics Conference, Japer AM1B.3, 2013, pp. 03.

Noe, et al., "Automatic endless polarization control with integrated-optical Ti:LiNbO3 polarization transformers", Reinhold Noe, Optics Letters, vol. 13, No. 6., Jun. 1988, pp. 527-529.

Noe, et al., "Endless Polarization Control Systems for Coherent Optics", Journal of Lightwave Technology, vol. 6, No. 7, Jul. 1988, pp. 1199-1208.

Oduro et al., "Selective Excitation of High Order Modes in Few Mode Fibres Using Optical Microfibres", Proceedings of the Optical Fiber Communications Conference, 2015, Paper M3D.5, pp. 05.

Omran et al., "Deeply-Etched Optical MEMS Tunable Filter for Swept Laser Source Applications", IEEE Photonic Technology Letters., vol. 26, No. 1, 2014, pp. 37-39.

Panicker et al., "Algorithms for compensation of multimode fiber dispersion using adaptive optics", J. Lightwave Technol. vol. 27, No. 24, 2009, pp. 5790-5799.

Papadopoulos et al., "Focusing and scanning light through a multimode optical fiber using digital phase conjugation", Optics Express, V. 20, No. 10, 2012.

Papadopoulos et al., High-resolution, lensless endoscope based on digital scanning through a multimode optical fiber, Biomedical Optics Express, vol. 4, No. 3, 2013.

Park et al., "Hybrid III-V/SOI single-mode vertical-cavity laser with in-plane emission into a silicon waveguide", 2015 Conference on Lasers and Electra-Optics. San Jose, CA. May 10-15, 2015. Paper SW3F.2. 2 pages.

Park et al., "III-V/SOI Vertical Cavity Laser with In-plane Output into a Si Waveguide", Paper W2A.17, Proceedings of the Optical Fiber Communication Conference, 2015.

Park et al.,"Jones matrix analysis for a polarization-sensitive optical coherencetomography system using fiber-optic components," Opt. Lett., vol. 29, No. 21, 2004, pp. 2512-2514.

Pircher et al.,"Polarization sensitive optical coherence tomography in the human eye," Prog. Retin. Eye. Res., vol. 30, No. 6, 2011, pp. 431-451.

Ploschner , "Fibre-based imaging: new challenges", Adaptive Optics and Wavefront Control for Biological Systems, Proc. of SPIE vol. 9335, 93350H, doi:10.1117/12.2077693, Mar. 2015.

Ploschner et al., "Compact multimode fiber beam-shaping system based on GPU accelerated digital holography", Opt. Lett., vol. 40, No. 2, 2015, pp. 197-200.

Ploschner et al., "GPU accelerated toolbox for real-time beam-shaping in multimode fibres", Optics Express, 2014, vol. 22, No. 3, doi:10.1364/OE.22.002933.

Ploschner et al., "Seeing through chaos in multimode fibres", Nature Photonics, doi:10:1038/NPHOTON, Jul. 2015,112, pp. 529-538.

Popoff et al., "Measuring the Transmission Matrix in Optics : An Approach to the Study and Control of Light Propagation in Disordered Media," Phys. Rev. Lett. 104(10), 100601-100605 (2010).

Porat et al., "Widefield Lensless Endoscopy via Speckle Correlations", Optics and Photonics News, Dec. 2016, p. 41.

Potsaid et al., "MEMS tunable VCSEL light source for ultrahigh speed 60kHz-1MHz axial scan rate and long range centimeter class OCT imaging", Proc. Of SPIE, vol. 8213, 2012, pp. 82130M-1-82130M-8.

Potsaid et al.,"Ultrahigh speed spectral / Fourier domain OCT ophthalmic imaging at 70,000 to 312,500 axial scans per second", Optics Express, vol. 16, No. 19, 2008, pp. 15149-15169.

Poulton et al., "Large-scale silicon nitride nanophotonic phased arrays at infrared and visible wavelengths", Optics Letters, v. 42, No. 1, doi: 10.13641OL.42.000021, 2017.

Poulton et al., "Optical Phased Array with Small Spot Size, High Steering Range and Grouped Cascaded Phase Shifters", Advanced Photonics 2016, OSA technical Digest, paper IW1B.2, doi: 10.1364/IPRSN.2016.IW1B.2, 2016,.

Preciado et al., "Multi-mode fibre correction for applications in optomechanics using a digital micromirror device", FTu1A.6, FiO/LS, OSA 2014.

Preciado et al., "Real-time optical eigenmode characterization", FTh3G.5, FiO/LS, OSA 2014.

Preston et al.,"OCTANE: Optical Coherence Tomography Advanced Nanophotonic Engine", CLEO 2013 Technical Digest, Paper AW31. 5, pp. 02.

Quack, et al., "MEMS-Enabled Silicon Photonic Integrated Devices and Circuits", IEEE Journal of Quantum Electronics, vol. 56, No. 1, Feb. 2020.

Rabinovich et al., "Free space optical communication link using a silicon photonic optical phased array", Proc. SPIE 9354, 93540B, doi:10.1117/12.2077222, 2015.

Ralston et al."Interferometric synthetic aperture microscopy", Nat. Phys., vol. 3. No. 2, 2007, pp. 129-134.

Rasras, et al., "Integrated resonance-enhanced variable optical delay lines", IEEE Photonics Technology Letters, vol. 17, No. 4., Apr. 4, 2005, pp. 834-836.

Raval et al., "Nanophotonic Phased Array for Visible Light Image Projection", in IEEE Photonics Conference (2016), paper MG3.4, doi: 10.1109/IPCon.2016.7831042, 2016.

(56) References Cited

OTHER PUBLICATIONS

Raval et al., "Unidirectional waveguide grating antennas with uniform emission for optical phased arrays", Optics Letters, v. 42, No. 12, doi: 10.1364/OL.42.002563, 2017.
Roelkens et al.,"Grating-Based Optical Fiber Interfaces for Silicon-on-Insulator Photonic Integrated Circuits", IEE Journal of Selected Topics in Quantum Electronics, vol. 17, No. 3, May/Jun. 2011, pp. 571-580.
Rosales-Guzman et al., "How to Shape Light with Spatial Light Modulators", SPIE Spotlight,doi: http://dx.doi.org/10.1117/3.2281295, 2017.
Rosales-Guzman et al., "Multiplexing 200 modes on a single digital hologram," ArXiv (2017).
Rosen, et al. "Focusing and Scanning through Flexible Multimode Fibers without Access to the Distal End", Jun. 29, 2015, 8 pages.
Rossant, et al., "Highlighting directional reflectance properties of retinal substructures from D-OCT images, EE Transactions on Biomedical Engineering", vol. 66, No. 11, EMB, Nov. 2019, pp. 3105-3118.
Rostykus et al., "Compact lensless off-axis transmission digital holographic microscope," Opt Ex, vol. 25, No. 14, 2017, pp. 16652-16659.
Ryf et al., "Photonic-Lantern-Based Mode Multiplexers for Few-Mode-Fiber Transmission",Proceedings of the Optical Fiber Communications Conference, 2015, Paper W4J.2, pp. 03.
Ryu, et al., "Combined system of optical coherence tomography and fluorescence spectroscopy based on double-cladding fiber", Optics Letters, vol. 33, No. 20, Oct. 15, 2008, pp. 2347-2349.
Sancho-Dura, et al., "Handheld multi-modal imaging for point-of-care skin diagnosis based on akinetic Integrated optics optical coherence tomography", Biophotonics Journal, 2018, pp. 1-6, 2018, Wiley-VCH Verlag, GmbH & Co. KGaA Weinheim.
Sarunic et al.,"Instantaneous complex conjugale resolved spectral domain and swept-source OCT using 3×3 fiber couplers", Opt. Express, vol. 13, No. 3, 2005, pp. 957-967.
Choma et al., "Sensitivity advantage of swept source and Fourier domain optical coherence tomography", Opt. Express, vol. 11, No. 18, 2003, pp. 2183-2189.
Christopher Vincent Poulton, "Integrated LIDAR with Optical Phased Arrays in Silicon Photonics". MIT MS EECS Thesis, Sep. 2016.
Chu, et al., "Compact 1 A-N thermo optic switches based on silicon photonic wire waveguides", Optics Express, vol. 13, No. 25, Dec. 12, 2005, pp. 10109- 10114.
Cizmar et al., "Shaping the light transmission through a multimode optical fibre: complex transformation analysis and applications in biophotonics," Opt. Ex., vol. 19, No. 20, 2011, pp. 18871-8884.
Cizmar et al.,"Exploiting multimode waveguides for pure fibre-based imaging" Nature Communications, 3:1027, doi: 10.1038/ncomms2024, May 2012.
Cole et al., "Integrated heterodyne interferometer with on-chip modulators and detectors", Optics Letters, vol. 40, No. 13, Jul. 1, 2015.
Cui, et al., Multifiber angular compounding optical coherence tomography for speckle reduction, Optics Letter, Jan. 1, 2017, pp. 125-128, vol. 42, No. 1, Optical Society of America.
Culemann et al., "Integrated optical sensor in glass for optical coherence tomography," IEEE J. Sel. Topics Quantum Electron., vol. 6, No. 5, 2000, pp. 730-734.
Czarske et al., "Transmission of independent signals through a multimode fiber using digital optical phase conjugation," Opt. Ex. vol. 24, No. 13, 2016, pp. 15128-15136.
Demas et al,Free-space beam shaping for precise control and conversion of modes in optical fiber,vol. 23, No. 22 DOI:10.1364/OE.23.028531, 2015.
Derose et al.,"Electronically controlled optical beam-steering by an active phased array of metallic nanoantennas", Optics Express, vol. 21, No. 4, Feb. 25, 2013, pp. 5198-5208.

Dietrich, et al., "In situ 3D Nanoprinting of Free-form Coupling Elements for Hybrid Photonic Integration", Nature Photonics, vol. 12, Apr. 2018, Macmillan Publishers Limited,pp. 1-5.
Ding et al., "Broadband High-Efficiency Half-Wave Plate: A Supercell-Based Plasmonic Metasurface Approach". ACS Nano, doi: 10.1021/acsnano.5b00218, 2015.
Doerr et al.,"Circular Grating Coupler for Creating Focused Azimuthally and Radially Polarized Beams", Optics Letters, vol. 36, No. 7, Apr. 1, 2011, pp. 1209-1211.
Doerr et al.,"Single-chip silicon photonics 100-GB/s coherent transceiver," in Optical Fiber Communication Conference,Optical Society of America, 2014), Th5C. 1, pp. 03.
Doerr, et al., "Monolithic PDM-DQPSK receiver in silicon", 36th European Conference and Exhibition on Optical Communication, 2010, 3 pages.
Doylend et al.,"Two-dimensional free-space beam steering with an optical phased array on silicon-on-insulator", Optics Express, vol. 19, No. 22, Oct. 24, 2011, pp. 21595-21604.
Drexler et al., "Optical Coherence Tomography", Springer Science & Business Media, 2008, pp. 35-38.
Dupuis et al.,"InP-based comb generator for optical OFDM," J. Lightw. Technol., vol. 30, No. 04, 2012, pp. 466-472.
Eigenwillig et al., "K-space linear Fourier domain mode locked laser and applications for optical coherence tomography", Optics Express, vol. 16, No. 12, 2008, pp. 8916-8937.
Eugui et al., Beyond backscattering: Optical neuroimaging by BRAD, arXiv:1712.00361v1 lphysic,s.optics] Dec. 1, 2017.
Fan et al., "Principal modes in multimode waveguides," Opt. Lett, vol. 30, 2005, pp. 135-137.
Fattal et al., "A multi directional backlight for a wide-angle, glasses-free three-dimensional display", Nature 495, 348, 2013.
Fechtig, et al., "Line-field parallel swept source MHz OCT for structural and functional retinal imaging", Biomedical, Optics Express, vol. 6, No. 3, Mar. 1, 2015, pp. 716-735, OSA.
Fercher et al., "Measurement of intraocular distances by backsattering spectral interferometry," Opt. Commun., vol. 117, No. 1, 1995, pp. 43-48.
Fertman et al., "Image transmission through an optical fiber using real-time modal phase restoration," JOSAB, 2013, vol. 30, No. 1, pp. 149-157.
Flanders et al., Silicon Optical Bench OCT probe for Medical Imaging, U.S. Pat. No. 8,515,221 B2. Aug. 2013.
Fujimoto et al., European Inventor Award 2017, Jun. 15, 2015, 3 pages. PRWeb.
Giacomelli et al., "Size and shape determination of spheroidal scatters using two-dimensional angle resolved scattering", Optics Express, vol. 18, No. 14, 2010, pp. 14616-14626.
Gourley et al., "First experimental demonstration of a Fresnel Axicon", Proceedings of the SPIE, vol. 7099, Jun. 18, 2008, pp. 70990D-1-70990D-7.
Gu et al., "Design of flexible multi-mode fiber endoscope", Optics Express, vol. 23, No. 21, Oct. 2015, doi:10.1364/OE.23.026905.
Gu et al., "Noise-reduction algorithms for optimization-based imaging through multimode fiber," Opt. Express, vol. 22, No. 12, 2014, pp. 15118-15132.
Guan et al., "Free-space coherent optical communication with orbital angular, momentum multiplexing/demultiplexing using a hybrid 3D photonic integrated circuit", Opt. Express, vol. 22, No. 145, doi: 10.1364/OE.22.000145, 2014.
Guo et al., "Two-Dimensional Optical Beam Steering with InP-based Photonic Integrated Circuits," IEEE J. Sel. Topics Quantum Electron., Special Issue on Semiconductor Lasers, 19, pp. 6100212, 2013.
Gusachenko et al., "Raman imaging through a single multimode fibre," Opt. Ex., vol. 25, No. 12, 2017, 13782-13798.
Heck, "Highly integrated optical phased arrays: photonio integrated circuits for optical beam shaping and Seam steering", Nanophotonics, 6(1): 93-107, doi: 10.1515/nanoph-2015-0152, 2017.
Hee et al., "Polarization-sensitive low-coherence reflectometer for birefringence characterization and ranging", J. Opt. Soc. Am. B, vol. 9, No. 6, 1992, pp. 903-908.

(56) References Cited

OTHER PUBLICATIONS

Heismann, "Analysis of a Reset-Free Polarization Controller for Fast Automatic Polarization Stabilization in Fiber-optic Transmission Systems", Journal of Lightwave Technology, vol. 12, No. 4., Apr. 1994, pp. 690-699.

Hillmann et al., "Common approach for compensation of axial motion artifacts in swept-source OCT and lispersion in Fourier-domain OCT", Optics Express, vol. 20, No. 6, Mar. 12, 2012, pp. 6761-6676.

Hitzenberger et al., In Vivo Intraocular Ranging By Wavelength Tuning Interferometry, SPIE, vol. 3251, retrieved from: http://proceedings.spiedigitallibrary.org/ an Sep. 24, 2013, pp. 47-51.

Hofer et al., "Dispersion encoded full range frequency domain optical coherence tomography", Opt. Express, vol. 17, No. 1, 2009, pp. 07-24.

Huang et al., "Optical coherence tomography," Science, vol. 254, No. 5035, 1991, pp. 1178-1181.

Huang, et al., Wide-field high-speed space-division multiplexing optical coherence tomography using an ntegrated photonic device, Biomedical Optics Express, Jul. 28, 2017, pp. 3856-3867, vol. 8, No. 8, DOI: 10.1364/3OE.8.003856.

Huber et al., "Buffered Fourier domain mode locking: unidirectional swept laser sources for optical coherence tomography imaging at 370,000 lines/s", Opt. Lett.,vol. 31, No. 20, 2006, pp. 2975-2977.

Huber et al., "Fourier Domain Mode Locking (FDML): A new laser operating regime and applications for optical coherence tomography", Opt. Express, vol. 14, No. 8, 2006, pp. 3225-3237.

Huber et al.,"Amplified, frequency swept lasers for frequency domain reflectometry and OCT imaging: design and Scaling principles", Optics Express, vol. 13, No. 9, 2005, pp. 3513-3528.

Huber et al.,"Three-dimensional and C-mode OCT imaging with a compact, frequency swept laser source at 1300 nm," Optics Express, vol. 13, No. 26, 2005, pp. 10523-10538.

Hulme et al., "Fully Integrated Hybrid Silicon Two Dimensional Beam Scanner", Optics Express, vol. 23, No. 5 doi:10.1364/DE.23.005861, pp. 5861-5874; Feb. 25, 2015.

Hulme et al., "Fully integrated hybrid silicon free-space beam steering source with 32 channel phased array" International Society for Optics and Photonics (SPIE PW), San Francisco, CA Feb. 1-6, 2014, pp. 898907-1-898907-15.

Hunsperger, Robert G., "Photonic Devices And Systems", 1994, Marcel Dekker, Inc., 1994, pp. 313-314.

Auksorius et al., "Dark-field Full-field Optical Coherence Tomography", Optics Letters, vol. 40, No. 14, Jul. 15, 2015, 4 pages.

Wu et al., "Quantitative Measurement of Subsurface Damage with Self-referenced Spectral Domain Optical Coherence Tomography", Optical Materials Express, vol. 7, No. 11, Nov. 1, 2017, 15 pages.

Abediasl et al., "Monolithic optical phased-array transceiver in a standard SOI CMOS process", Opt. Express 23, 6509, doi: 10.13641OE.23.006509, 2015.

Acoleyen et al.,Two-dimensional optical phased array antenna on silicon-on-insulator, Optics Express, vol. 18, No. 13, Jun. 21, 2010, pp. 13655-13660.

Adie et al., "Interferometric Synthetic Aperture Microscopy (ISAM)", In Optical Coherence Tomography: Technology and Applications. 2nd ed.; Drexler, W., Fujimoto, J. G., Eds.; Springer International Publishing, Switzerland, 2015, pp. 965-1004.

Aflatouni et al., "Nanophotonic coherent imager", Optics Express, vol. 23, No. 4, 2015, pp. 5117-5125, doi: 10.1364/ DE.23.005117,2015.

Agiltron Inc. "Endless Polarization Controller". Obtained from https://agiltron.conn/dic/specs/Endless%20Polarization%20Controller.pdf. Jun. 3, 2011.

Aguirre et al., "Robustness of multimode fiber focusing through wavefront shaping", in Latin America Optics and Photonics Conference (2014).

Aieta et al., "Out-of-Plane Reflection and Refraction of Light by Anisotropic Optical Antenna Metasurfaces with Phase Discontinuities", Nano Lett., vol. 12, No. 3, 2012, pp. 1702-1706, doi: 10.1021/n1300204s.

Akca et al., "Miniature spectrometer and Beam splitter for an optical coherence tomography on a silicon chip", Optics Express, 2014, vol. 21, No. 14, pp. 16648-16656.

Akca et al., "Toward Spectral-Domain Optical Coherence Tomography on a Chip," IEEE J. Sel. Top. Quantum Electron., vol. 18, No. 3. 2012. pp. 1223-1233.

Akca, "Spectral-Domain Optical Coherence Tomography on a Silicon Chip", PHD Thesis. University of Twente, 2012, pp. 164.

Akca, Imran B., "Non-moving scanner design for OCT systems", Optics Express, Dec. 12, 2016, vol. 24, No. 25.

Alam et al.,"Recent Progress in the Development of Few Mode Fiber Amplifiers", Proceedings of the Optical Fiber Communications Conference, Paper Tu3C.1, 2015 pp. 03.

Almeida et al.,"Nanotaper for compact mode conversion", Optics Letters, vol. 28, No. 15, Aug. 1, 2003, pp. 1302-1304.

Anderson et al., "Stabilization of the speckle pattern of a multimode fiber indergoing bending", Optics Letters, vol. 21, No. 11, Jun. 1996.

Arrizon et al.,"Pixelated phase computer holograms for the accurate encoding of scalar complex fields", J. Opt. Soc. Am. A/vol. 24, No. 11, Nov. 2007.

Baumann et al."Swept source Fourier domain polarization sensitive optical coherence tomography with a passive polarization delay unit" Opt. Express, vol. 20, No. 9, 2012, pp. 10229-10241.

Beckwith et al.,"Image distortion in multimode fibers and restoration by polarization preserving phase conjugation", Optics Letters, vol. 12, No. 8, 1987.

Bellanger et al., "Coherent fiber combining by digital holography", Optics Letters, Dec. 2008, vol. 33, No. 24.

Bianchi et al., "A multi-mode fiber probe for holographic micromanipulation and microscopy", Lab on a Chip, vol. 121, No. 635, 2012.

Bianchi et al., "High numerical aperture imaging by using multimode fibers with micro-fabricated optics", in CLEO: Science and Innovations (OSA, 2014), Paper 3M2N.6.

Biedermann et al.,"Dispersion, coherence and noise of Fourier domain mode locked lasers", Opt. Express, vol. 17, No. 12, 2009, pp. 9947-9961.

Billah, et al., "Hybrid Integration of Silicon Photonics Circuits and InP Lasers by Photonic Wire Bonding", Optica, vol. 5, No. 7, Jul. 2018, pp. 876-883.

Blahut et al. "Multimode interference structures—properties and applications". Optica Applicata, vol. XXXIV, No. 4, 2004, pp. 573-587.

Blatter et al.,"High-speed functional OCT with self-reconstructive Bessel illumination at 1300 nm", Proceedings of the SPIE, vol. 8091, Jun. 1, 2011, pp. 809104-1-809104-6, doi:10.1117/12.889669.

Boer et al., "Review of polarization sensitive optical coherence tomography and Stokes vector determinahon," J. Blamed. Opt., vol. 7, No. 3, 2002, pp. 359-371.

Boer et al.,"Improved signal-to-noise ratio in spectral-domain compared with time-domain optical coherence tomography," Opt. Lett., vol. 28, No. 21, 2003, pp. 2067-2069.

Boudoux, et al., Rapid wavelength-swept spectrally encoded confocal microscopy, Optics Express, Oct. 3, 2005, pp. 8214-8221, vol. 13, No. 20, OSA.

Bozinovic et al., "Terabit-Scale Orbital Angular Momentum Mode Division Multiplexing in Fibers", Science Magazine, vol. 340, Jun. 28, 2013, pp. 1545-1548.

Bru, et al., "Integrated optical frequency domain reflectometry device for characterization of complex integrated devices", Optics Express, Nov. 12, 2018, vol. 26, No. 23, doi:10.1364/OE.26.030000.

Brzobohaty et al.,"High quality quasi-Bessel beam generated by round-tip axicon", Optics Express, vol. 16, No. 17, Feb. 2008, pp. 12688-12700.

Burns et al.,"A Wafer-Scale 3-D Circuit Integration Technology", IEEE Transactions on Electronic Devices, vol. 53, No. 10, Oct. 2006, pp. 2507-2516.

Caravaca-Aguirre et al., "Single multimode fiber endoscope," Opt Ex., vol. 25, No. 3, 2017, pp. 656-1665.

(56) References Cited

OTHER PUBLICATIONS

Caravaca-Aguirre et al.,"High-speed phase modulation for multimode fiber endoscope," Imaging Appl. Opt, 2014.
Caravaca-Aguirre, "Real-time resilient focusing through a pending multimode fiber", Optics Express, vol. 21, No. 10, 2013, DOI:10.1364/OE.21.012881.
Carpenter et al., "110×110 optical mode transfer matrix inversion", Opt. Express, vol. 22, 2014, pp. 96-101.
Carpenter et al., "Comparison of principal modes and spatial eigenmodes in multimode, optical fibre," Laser Photon. Rev., Dec. 2016.
Carpenter et al., "First demonstration of principal modes in a multimode fibre," in European Conference on Optical Communication, ECOC, 2014.
Carpenter et al.,"Complete spatiotemporal characterization and optical transfer matrix inversion of a 420 mode fiber." Opt. Lett., vol. 41, No. 23, 2016, pp. 5580-5583.
Chan et al., "Optical beamsteering using an 8×8 MEMS phased array with closed-loop interferometric phase control", Opt. Express; vol. 21, 2013, pp. 2807-2815.
Chandrasekhar et al.,"Enabling Components for Future High-Speed Coherent Communication Systems", Optical Fiber Communication Conference Tutorial, 2011, pp. 01-55.
Chen et al., "Compact spatial multiplexers for mode division multiplexing", Optics Express, vol. 22, No. 26, Dec. 26, 2014, pp. 31582-31594.
Chen et al., "Design Constraints of Photonic-Lantern Spatial Multiplexer Based on Laser-Inscribed 3-D Waveguide Technology", Journal of Lightwave Technology, vol. 33, No. 6, Mar. 15, 2015, pp. 1147-1154.
Chen et al.,"Low-Loss and Broadband Cantilever Couplers Between Standard Cleaved Fibers and High-Index-Contrast Si3N4 or Si Waveguides", IEEE Photonics Technology Letters, vol. 22, No. 23, Dec. 1, 2010, pp. 1744-1746.
Chen et al.,"Monolithically integrated 40-wavelength demultiplexer and photodetector array on silicon," IEEE Photonics Technol. Lett., vol. 23, No. 13, 2011, pp. 869-871.
Chinn et al., "Optical coherence tomography using a frequency-tunable optical source," Opt. Lett, vol. 22, No. 5, 1997, pp. 340-342.
Choi et al., "Optical imaging with the use of a scattering lens", IEEE J. Sel. Top. Quantum Electron, vol. 20, No. 2, 2014, pp. 61-73.
Choi et al., "Phase sensitive swept-source optical coherence tomography imaging of the human retina with a vertical cavity surface-emiting laser light source." Opt. Lett., vol. 38, No. 3, 2013, pp. 338-340.
Choi et al., "Scanner-Free and Wide-Field Endoscopic Imaging by Using a Single Multimode Optical Fiber" Physical Review Letters, vol. 109, 203901, Nov. 2012.
Choi, et al., "All-fiber variable optical delay line for applications in optical coherence tomography: feasibility study for a novel delay line", Optics Express, vol. 13, No. 4, Feb. 21, 2005, pp. 1334-1345.
Pahlevaninezhad et al. "Fiber-Based Polarization Diversity Detection for Polarization-Sensitive Optical Coherence Tomography", Photonics, vol. 1, No. 4, 2014, pp. 283-295.
Sarunic et al.,"Real-Time Quadrature Projection Complex Conjugate Resolved Fourier Domain Optical Coherence Tomography," Optics Letters, vol. 31, No. 16, Aug. 15, 2006, pp. 2426-2428.
Sasaki et al., "Direct photolithography on optical fiber", Jpn. J. Appl. Phys. 41(Part 1, No. 6B), 2002, pp. 4350-4355.
Schneider et al., "Optical coherence tomography system mass producible on a silicon photonic chip",Optics Express , vol. 24, No. 2, Jan. 2016, pp. 1573-1586.
Selvaraja et al., "Record low-loss hybrid rib/wire waveguides for silicon photonic circuits," Group IV Photonics, 2010, pp. 03.
Shalaev et al., "High-Efficiency All-Dielectric Metasurfaces for Ultracompact Beam Manipulation in Transmission Mode", Nano Letters, vol. 15, No. 9, pp. 6261-6266, doi: 10.1021/ac,s.nanolett.5b02926, 2015.

Shuang et al., "Generalized recovery algorithm for 3D super-resolution microscopy using rotating point spread Functions", Scientific Reports, 6:30826, DOI: 10.1038/srep30826, 2016.
Siddiqui et al."Compensation of spectral and RF errors in swept-source OCT for high extinction complex demodulation", Opt. Express, vol. 23, 2015, pp. 5508-5520.
Siddiqui, et al., "High-speed optical coherence tomography by circular interterometric ranging",Nature Photonics, Feb. 2018, vol. 12.
Sivankutty, et al. "Ultra-thin rigid endoscope: two-photon imaging through a graded-index", Optics Express,vol. 24, No. 2, OSA, Jan. 25, 2016, pp. 825-841.
Sokolovskii et al.,"Bessel beams from semiconductor light sources", Progress in Quantum Electronics, vol. 38, No. 4, Jul. 2014, pp. 157-188.
Soldano et al., "Optical Multi-Mode Interference Devices Based on Self-Imaging: Principles and Applications", Journal of Lightwave Technology, vol. 13, No. 4, Apr. 1995.
Soref, "Tutorial: Integrated-photonic switching structures", APL Photonics, doi. Drg/10.1063/1.5017968, Jan. 29, 2018, 19 pages.
South et al., "Polarization-Sensitive Interferometric Synthetic Aperture Microscopy", Applied Physics Letters, vol. 107, No. 21, DOI: Artn 211106 10.1063/1.4936236. 2015.
Steinvurzel et al.,"Fiber-based Bessel beams with controllable diffraction-resistant distance", Optics Letters, vol. 36, No. 23, 2011, pp. 4671-4673.
Stone et al., "Low index contrast imaging fibers," Opt. Lett. vol. 42, No. 8, 2017, 1484-1487.
Stutzmam et al., "Antenna Theory and Design", John Wiley & Sons, ISBN 0-471-04458-X, 1981, pp. 305, Textbook.
Sun et al.,"Large-scale nanophotonic phased array", Nature, Jan. 10, 2013, vol. 493, pp. 195-199.
Sun et al.,"Large-Scale Silicon Photonic Circuits for Optical Phased Arrays", IEEE Journal of Selected Topics in Quantum Electronics, vol. 20, No. 4, Jul./Aug. 2014, p. 15.
Sun et al.,"Two-dimensional apodized silicon photonic phased arrays", Optics Letters, vol. 39, No. 2, Jan. 15, 2014, pp. 367-370.
Suni et al., "Photonic Integrated Circuits for Coherent Lidar", 18th Soherent Laser Radar Conference, CLRC 2016, Jun. 26-Jul. 1, 2016.
Taillert et al.,"A compact two-dimensional grating coupler used as a polarization splitter", IEEE Photon. Tech. Lett., vol. 15, 2003, pp. 1249-1251.
Takiguchi, et al., Integrated-optic variable delay line and its application to a low-coherence reflectometer, Optics Letters, Oct. 15, 2005, pp. 2739-2741, vol. 30, No. 20, Optical Society of America.
Tearney et al.,"Spectrally Encoded Confocal Microscopy", Optics Letters, vol. 23, No. 15, 1998, pp. 1152-1154.
Trappen, et al. 3D-Printed Optics for Wafer-Scale Probing, 2018 European Conference on Optical Communication, Sep. 23-27, 2018, Rome, Italy, 3 pages, IEEE.
Tsai et al.,"Ultrahigh speed endoscopic optical coherence tomography using micromotor imaging catheter and VCSEL Technology", Biomed. Opt. Express, vol. 4, No. 7, 2013, pp. 1119-1132.
Tu, et al., "State of the Art and Perspectives on Silicon Photonic Switches", Micromachines, vol. 10, No. 55, doi:10.3390/mi10010051., 2019, 19 pages.
Vakoc et al., "Elimination of depth degeneracy in optical frequency-domain imaging through polarization-based optical demodulation",Opt. Lett., vol. 31, No. 3, 2006, pp. 362-364.
Vakoc et al., "Phase-resolved optical frequency domain imaging," Opt. Express, vol. 13, No. 14, 2005, pp. 5483-5493.
Velazquez-Benitez et al., Six mode selective fiber optic spatial multiplexer, Optics Letters, vol. 40, No. 8, Apr. 15, 2015, pp. 1663-1666.
Velha, et al., Wide-band polarization controller for Si photonic integrated circuits, Optics Letters, vol. 41, No. 21., Dec. 15, 2016, pp. 5656-5659.
Vermeulen et al., "High-efficiency fiber-to-chip grating couplers realized using an advanced CMOS-compatible siliconon-insulator platform", Opt. Express, vol. 18, No. 17, 2010, pp. 18278-18283.

(56) References Cited

OTHER PUBLICATIONS

Vermeulen et al.,"Silicon-on-insulator polarization rotator based on a symmetry breaking silicon overlay," IEEE Photonics Technol. Lett., vol. 24, No. 5, 2012, pp. 482-484.
Wang et al., "Three dimensional optical angiography," Opt.Express, vol. 15, No. 7, 2007, pp. 4083-4097.
Wang et al.,"Depth-encoded all-fiber swept source polarization sensitive OCT", Biomed. Opt. Express, vol. 5. No. 9, 2014, pp. 2931-2949.
Wang et al.,"In vivo full range complex Fourier domain optical coherence tomography", Appl. Phys. Lett., vol. 90, No. 5, 2007, 054103, pp. 04.
Wang, et al., "Compact high-extinction-ratio silicon photonic variable optical attenuators (VOAs)", Proceedings of the Conference on Lasers and Electra Optics (CLEO), 2 pages, Paper SW1N.7, 2017.
Wang, et al., "Phase error corrected 4-bit true time delay module using a cascaded 2×2 polymer waveguide switch array" Applied Optics, vol. 46, No. 3., Jan. 20, 2007, pp. 379-383.
Warren et al., "Adaptive multiphoton endomicroscopy through a dynamically Deformed multicore optical fiber using proximal detection," Opt. Ex., vol. 24, No. 19, 2016, pp. 21474-21484.
Weber et al.,"Highly compact imaging using Bessel beams generated by ultraminiaturized multi-micro-axicon systems", Journal of Optical Society of America A., vol. 29, No. 5, May 2012, pp. 808-816.
Westbrook et al., "Continuous multicore optical fiber grating arrays for distributed sensing applications", Journal of Lightwave Technology, v PP, Issue 99, pp. 1-5, doi: 10.1109/JLT.2017.2661680, 2017.
Wieser et al.,"High definition live 3D-OCT in vivo: design and evaluation of a 4D OCT engine with 1 GVoxel/s," Biomed. Opt. Express, vol. 5, No. 9, 2014, pp. 2963-2977.
Wojtkowski et al.,"Full range complex spectral optical coherence tomography technique in eye imaging," Opt. Lett.,vol. 27. No. 16, 2002, pp. 1415-1417.
Wojtkowski, et al., "Ultrahigh-resolution, high-speed, Fourier domain optical coherence tomography and methods for dispersion compensation", Optics Express, vol. 12, No. 11, May 31, 2004, pp. 2404-2422.
Wood et al.,"Quantitative Characterization of endoscopic imaging fibers," Opt. Ex. vol. 25, No. 3, 2017, pp. 1985-1992.
Worhoff et al.,"Design and application of compact and highly tolerant polarization-independent waveguides." IEEE J. Lightw. Technol., vol. 25, No. 5. 2007, pp. 1276-1282.
Worhoff et al.,"Silicon Oxynitride Technology for Integrated Optical Solutions in Biomedical Applications", In: 13th International Conference on Transparent Optical Networks 2011, Jun. 26-30, 2011, pp. 1-4.
Xi et al.,"Generic real-time uniform K-space sampling method for high-speed swept-Source optical coherence tomography", Optics Express, vol. 18, No. 9, 2010, pp. 9511-9517.
Xie et al.,"Axicon on a gradient index lens (AXIGRIN)): integrated optical bench for Bessel beam generation from a point-like source", Applied Optics, vol. 53, Issue 26, 2014, pp. 6103-6107.
Xie et al., "Fiber-optic-bundle-based optical coherence tomography", Optics Letters, vol. 30, No. 14, Jul. 15, 2005, pp. 1803-1805.
Xie, et al., "Seven-bit reconfigurable optical true time delay line based on silicon integration", Optics Express,vol. 22, No. 19, Sep. 22, 2014, pp. 22707-22715.
Xu et al., "Automated Interferometric Synthetic Aperture Microscopy and computational Adaptive Optics for Improved Optical Coherence Tomography", Applied Optics, 55, (8), 2034-2041,Joi:10.1364/Ao.55.002034, 2016.
Yaacobi et al., "Integrated phased array for wide-angle beam steering", Opt. Lett. 39, 4575, doi: 10.1364/OL.39.004575, 2014.
Yaacobi et al.,"Vertical emitting aperture nanoantennas", Optics Letters, vol. 37, No. 9, May 1, 2012, pp. 1454-1456.
Yamanari et al.,"Full-range polarization-sensitive swept-source optical coherence tomography by simultaneous transversal and spectral modulation", Opt. Express, vol. 18, No. 13, 2010, pp. 13964-13980.
Yang et al. "Double-ring cavity configuration of actively mode-locked multi-wavelength fiber laser with equally tunable wavelength spacing", Appl. Phys. B, vol. 80, Feb. 16, 2005, pp. 445-448.
Yazdanfar et al.,"High resolution imaging of in vivo cardiac dynamics using color Doppler optical Coherence tomography," Opt. Express, vol. 1, No. 13, 1997, pp. 424-431.
Yerolatsitis et al., "Tapered Mode Multiplexers for Single Mode to Multi Mode Fibre Mode Transitions", Proceedings of the Optical Fiber Communications Conference, Paper w3B.4, 2015, pp. 03.
Yoo et al., "A 32×32 Optical Phased Array Using Polysilicon Sub-Wavelength High-Contrast-Grating Mirrors", Opt. Expr., 22, doi:10.1364/OE.22.019029, 2014.
Yoo et al., "Heterogeneous 2D/3D Photonic Integrated Microsystems", Microsystems & Nanoengineering, v. 2, 16030; doi:10.1038/micronano.2016.30, 2016.
Yun et al., "High-speed optical frequency-domain imaging," Opt. Express, vol. 11, No. 22, 2003, pp. 2953-2963.
Yun et al.,"Removing the depth-degeneracy in optical frequency domain imaging with frequency shifting", Opt. Express, vol. 12, No. 20, 2004, pp. 4822-4828.
Yurtsever et al., "Photonic integrated Mach-Zehnder Interterometer with an on-chip reference arm for optical coherence tomography," Blamed. Opt. Express, 2014, vol. 5, No. 4, pp. 1050-1061.
Yurtsever et al., "Ultra-compact silicon photonic integrated Interterometer for swept-source optical coherence tomography," Opt. Lett., 2014, vol. 39, No. 17, pp. 5228-5231.
Yurtsever et al.,"Integrated photonic circuit in silicon on insulator for Fourier domain optical coherence tomography", in Proc. SPIE, Opt. Coherence Tomography Coherence Domain Opt. Methods Blamed. XIV, vol. 7554, 2010, pp. 1-5.
Zaoui et al.,"Cost effective CMOS-compatible grating couplers with backside metal mirror and 69% coupling efficiency", Optics Express, vol. 20, No. 26, Dec. 10, 2012, pp. B238-B243.
Zhao et al., "Phase-resolved optical coherence tomography and optical Doppler tomography far imaging blood flow in human skin with fast scanning speed and high velocity sensitivity," Opt. Lett., vol. 25, No. 2, 2000, pp. 114-116.
Zhou, et al., All-in-one silicon photonic polarization processor, Nanophotonics, vol. 3, No. 12, 2019, pp. 2257-2267.
Zhou, et al., "Space-division multiplexing optical coherence tomography", Optics Express, vol. 21, No. 16, Aug. 12, 2013, pp. 19219-19227,OSA.
Zhu et al., "Scanning fiber angle-resolved low coherence interferometry", Optics Letters, vol. 34, No. 20, 2009, pp. 3196-3198.
Zhuang, et al., "Low-loss, high-index-contrast Si3N4/SiO2 optical waveguides for optical delay lines in microwave photonics signal processing", Optics Express, vol. 19, No. 23., Oct. 17, 2011, pp. 23162-23170.
Zuo et al., "Computational microscopy with programmable illumination and coded aperture", Proceedings of the SPIE, vol. 10250, doi: 10.1117/12.2266652, 2016.
Farahi et al., "Dynamic bending compensation while focusing hrough a multimode fiber", Opt. Express, vol. 21, No. 19, 2013, pp. 22504-22514.
Hutchison et al., "High-resolution aliasing-free optical beam steering", Optica 3, 887, doi: 10.1364/OPTICA.3.000887, 2016.
Izutsu et al.,"Integrated optical SSB modulator/frequency shifter," IEEE J. Quant. Electron., vol. 2, No. 11, 1981, pp. 2225-2227.
J. Sun, "Toward accurate and large-scale silicon photonics," MIT Ph.D. Thesis, 2013.
Jayaraman et al., "High-sweep-rate 1310 nm MEMS-VCSEL with 150 nm continuous tuning range," Electron. Lett., vol. 48, No. 14, Oct. 2012, pp. 867-869.
Jayaraman et al., "Rapidly Swept, ultra-widely-tunable 1060 nm MEIVIS-VCSELs", Electronics Letters, vol. 48, No. 21, Oct. 11, 2021, 2 pages.
Ji, et al., "On-chip tunable photonic delay line", APL Photonics, 2019, pp. 090803-1-090803-7, 4doi 10.1063/1.5111164.
Jia et al., "Split-spectrum amplitude-decorrelation angiography with optical coherence tomography," Opt. Express, vol. 20, No. 4, 2012, pp. 4710-4725.

(56) References Cited

OTHER PUBLICATIONS

Jinguji, et al., "Two-port optical wavelength circuits composed of cascaded Mach-Zehnder interferometers with point-symmetrical configurations", Journal of Lightwave Technology, vol. 14, No. 10., Oct. 10, 1996, pp. 2301-2310.
Joel Carpenter, Everything you always wanted to know about Multimode Fiber, IEEE Photonics Society Newsletter, pp. 4-10, Aug. 2017.
Khilo et al. "Efficient planar fiber-to-chip coupler based on two-stage adiabatic evolution", Optics Express, vol. 18, No. 15, Jul. 19, 2010, pp. 15790-15806.
Koch, et al., "Versatile endless optical polarization controller/tracker/demultiplexer", Optics Express, vol. 22, No. 7, Apr. 7, 2014, pp. 8259-8276.
Koenderink et al., "Nanophotonics: Shrinking light-based technology", Science, v. 348, No. 6234, doi: 10.1126/science.1261243, 2015.
Komljenovic et al., "Sparse aperiodic arrays for optical beam forming and LIDAR", Opt. Express, vol. 25, No. 2511, doi: 10.1364/OE.25.002511, 2017.
Krause et al., "Motion Compensated Frequency Modulated Continuous Wave 3D Coherent Imaging Ladar with Scannerless Architecture," Appl. Opt., 51, 2012, pp. 8745-8761.
Lee et al., "Dual Detection Full Range Frequency Domain Optical Coherence Tomography", Opt. Lett., vol. 35, No. 7, 2010, pp. 1058-1060.
Lee et al., "Silicon Photonic Switch Fabrics: Technology And Architecture", Journal Of Lightwave Technology, Doi 10.1109/jlt.2018.2876828, 2018, 15 Pages.
Lee et al., "Ultra-low-loss optical Delay Line On A Silicon Chip", Nature Communications, May 2012, 7 Pages.
Leitgeb et al., "Performance of fourier domain vs. time domain optical coherence omography", Opt. Express,vol. 11, No. 8, 2003, pp. 889-894.
Lemire-Renaud, et al., "Double-clad fiber coupler for endoscopy", Optics Express, vol. 18, No. 10, May 10, 2020, OSA., pp. 9755-9764.
Leonardo et al., "Hologram transmission through multi-mode optical fibers," Opt. Ex., vol. 19, No. 1, 2011, pp. 247-254.
Leon-Saval et al., "Mode-selective photonic lanterns for space division multiplexing",Optics Express, 2014, vol. 22, No. 1, Jan. 13, pp. 09.
Li et al., "CMOS-compatible High Efficiency Double-Etched Apodized Naveguide Grating Coupler", Opt. Expr., vol. 21, pp. 7868, 2013.
Liang, et al., "Cycloid Scanning for Wide Field Optical Coherence Tomography Endomicroscopy and Angiography in Vivo", Optica, vol. 5, No. 1, Jan. 2018, pp. 36-43.
Lippok, et al., "Dispersion compensation in Fourier domain optical coherence tomography using the fractional Fourier transform", Optics Express, vol. 20, No. 1, Oct. 8, 2012, pp. 23398-23413.
Liu et al., "Computational optical coherence tomography",https://doi.org/10.1364/BOE.8.001549, Feb. 2017.
Liu et al.,"High performance continuous wave 1.3 um quantum dot lasers on silicon", Applied Physics Letters, vol. 104, 2014, pp. 041104-1-041104-4.
Liu, et al., "High-speed optical modulation based on carrier depletion in a silicon waveguide", Optics Express, vol. 15, No. 2, Jan. 22, 2007, pp. 660-668.

Lorenser et al.,"Energy-efficient low-Fresnel-number Bessel beams and their application in optical coherence tomography", Optics Letters, vol. 39, No. 3, Feb. 1, 2014, pp. 548-551.
Loterie et al., "Bend translation in multimode fiber imaging," Opt. Ex., vol. 25, No. 6, 2017, pp. 3263-6273.
Loterie et al., "Confocal microscopy through a multimode fiber using optical correlation," Opt. Lett., vol. 40, No. 24, 2015, pp. 5754-5757.
Loterie, et al., "Digital confocal microscopy through a multimode fiber," http://arxiv.org/abs/1502.04172 (2015).
Lu et al., "Adaptive control of waveguide modes in a twomode fiber," Opt. Ex., vol. 22, No. 3, 2014, pp. 2955-2964.
Lu et al.,"Handheld ultrahigh speed swept source optical coherence tomography instrument using a MEMs scanning mirror", Biomedical Optics Express, vol. 5, No. 1, 2014, pp. 293-311.
Lukic et al., "Endoscopic fiber probe for nonlinear spectroscopic imaging", Optica, vol. 4, No. 5, doi: 10.1364/OPTICA.4.000496, 2017.
Mack, et al., "Photonic Integrated Circuit Switch Matrix and Waveguide Delay Lines for Optical Packet Synchronization" ECOC 2008, Sep. 21-25, 2008, pp. 87-88, vol. 4, IEEE, Brussels, Belgium.
Makita et al., "Optical coherence angiography," Opt. Express, vol. 14, No. 17, 2006, pp. 7821-7840.
Mao et al., "Performance analysis of a swept-source optical coherence tomography system with a quadrature interterometer and optical amplification", Optics Communications, vol. 284, Issues 10-11, 2011, pp. 2622-2627.
Margallo-Balbas et al., "Miniature Optical Coherence Tomography System Based on Silicon Photonics", Proc. of SPIE, vol. 6847, 2008, pp. 68470S-1-68470S-11.
Margallo-Balbas et al.,"Miniature 10 KHz thermo-optic delay line in silicon," Opt. Lett., vol. 35, No. 23, 2010, pp. 4027-4029.
McManamon et al., "A Review of Phased Array Steering for Narrow-Band Electrooptical Systems", Proc. of the IEEE, 97, pp. 1078, doi: 10.1109/JPROC.2009.2017218, 2009.
Mehta et al., "Precise and diffraction-limited waveguide-to-free-space focusing gratings," arXiv 1607.00107, 2016.
Mekis et al.,"A Grating-Coupler-Enabled CMOS Photonics Platform". IEEE Journal of Selected Topics in Quantum Electronics, vol. 17, Issue 3, May/Jun. 2011, pp. 597-608.
Mekis et al.,"Two-dimensional photonic crystal couplers for Uni-directional light output," Opt. Lett., vol. 25, No. 13, 2000, pp. 942-944.
Moore et al., "Shape sensing using multi-core fiber optic cable and parametric curve solutions", Optics Express, vol. 20, Issue 3, pp. 2967-2973, https://doi.org/10.1364/OE.20.002967, 2012.
Morales-Delgado et al., "Delivery of focused short pulses through a multimode fiber", Opt. Express, vol. 23, No. 7,2015, pp. 9109-9120.
Morales-Delgado et al., "Two-photon imaging through a multimode fiber," Opt. Ex., vol. 23, No. 25, 2015, pp. 32158-32170.
Morgner et al.,"Spectroscopic optical coherence tomography", Opt. Lett., vol. 25, No. 2, 2000, pp. 111-113.
Mounaix et al., "Temporal recompression through a scattering medium via a broadband transmission matrix," ArXiv (2017).
Carpenter et al., "Observation of Eisenbud-Wigner-Smith States as Principal Modes in Multimode Fibre," Nature Photonics, vol. 9. Nov. 2015, pp. 751-757.
Merola et al., "Fabrication and Test of Polymeric Microaxicons", Proceedings of the SPIE, vol. 8428, 2012, pp. 84280P-1-84280P-11.

* cited by examiner

OPTICAL COHERENCE TOMOGRAPHY SYSTEM FOR SUBSURFACE INSPECTION

The section headings used herein are for organizational purposes only and should not be construed as limiting the subject matter described in the present application in any way.

Introduction

Optical coherence tomography (OCT) is commonly used for minimally invasive optical imaging in medical application. Optical coherence tomography can provide high-resolution, cross-sectional images of tissues which can seamlessly integrated into other diagnostic procedures. In particular, OCT has revolutionized the practice of ophthalmology. Also, OCT can provide real-time images of tissues in situ where conventional excisional biopsy is hazardous or impossible. Optical coherence tomography is useful for many other applications such as imaging, ranging, sensing, and communication.

SUMMARY

One aspect of the present teaching is a bright field optical coherence tomography system that includes a broadband light source that generates broadband light. Illumination optics projects the generated broadband light to a sample positioned so that at least some of the projected generated broadband light is scattered from within the sample in a direction that is normal to a surface of the sample to form a sample beam and at least some of the projected generated broadband light is reflected from a top surface of the sample in a direction that is normal to the surface of the sample to form a reference beam. Collection optics collects light in the sample beam and in the reference beam, and projects the collected light to an interferometric combiner. The illumination optics and the collection optics together form reflective imaging optics where light in the sample beam co-propagates with light in the reference beam without transmission through dispersive optical elements, thereby reducing the OCT system dispersion and chromatic aberration. An interferometric combiner interferometrically combine the collected light from the sample beam and collected light from the reference beam and projects the interferometrically combined light to a spectrometer that generates spectral interferometric information from the combined sample and reference beams. A processor processes the spectral interferometric information to determine information about the sample.

Another aspect of the present teaching is a dark field optical coherence tomography system that includes a broadband light source that generates broadband light. A beam splitter splits the generated broadband light into a reference beam and an illumination beam. A reference mirror reflects the reference beam. Illumination optics includes a transparent region that passes the illumination beam and a reflective surface with an optical power. Collection optics has a transparent region and a reflective surface with an optical power that reflects the illumination beam from the reflective surface of the collection optics to the reflective surface of the illumination optics such that the illumination beam is redirected to a surface of the sample at an angle that results in scattering from within the sample that forms a sample beam propagating normal to the surface of the sample and through the transparent region of collection optics and through the transparent region of the illumination optics. An interferometric combiner interferometrically combines the sample beam and the reference beam to provides the combined beam to a spectrometer that generates spectral interferometric information. A processor processes the spectral interferometric information to determine information about the sample.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings described below are for illustration purposes only. The drawings are not necessarily to scale; emphasis is instead generally being placed upon illustrating principles of the teaching. The drawings are not intended to limit the scope of the Applicant's teaching in any way.

DESCRIPTION OF VARIOUS EMBODIMENTS

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications, and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

One aspect of the present teaching is spectral domain optical coherence tomography system and methods according to the present teaching that can provide improved imaging for numerous medical application. In addition, the spectral domain optical coherence tomography system according to the present teaching have numerous other industrial application, such as subsurface inspection. For example, the systems and methods according to the present teaching can be used to determine subsurface material defects in precision optics that are source of back-scattering light signal which degrades the performance of the optical elements. It is important to determine these subsurface material defects during manufacturing of many products and system.

It should be understood that the spectral domain optical coherence tomography systems of the present teaching can be configured in a bright field or in a dark field configuration. Also, it should be understood that the systems according to the present teaching can be configured in free space optical configuration or in a fiber or wave guided configuration where at least some of the optical paths are guided.

Figure 1:
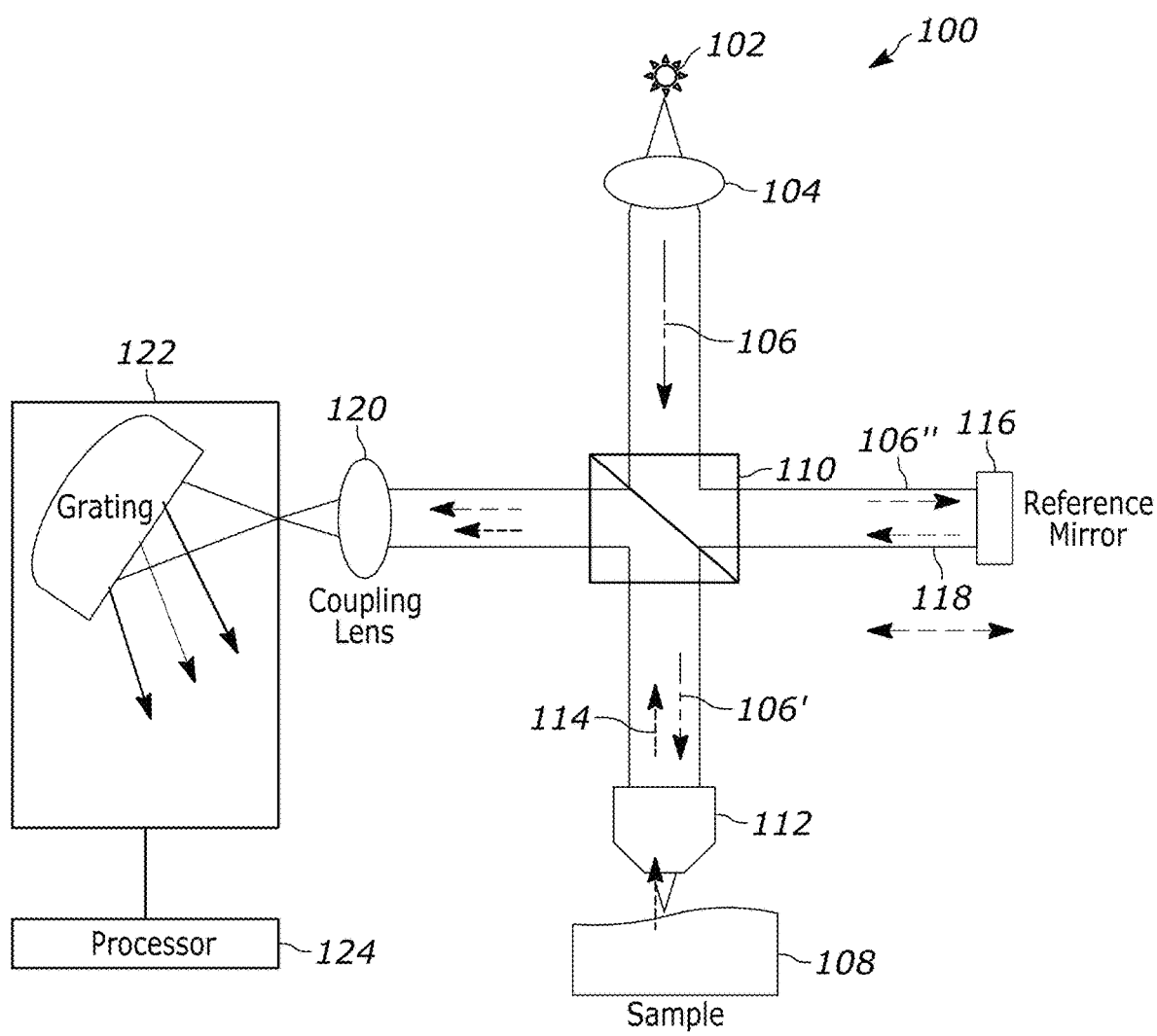
FIG. 1 illustrates a spectral domain optical coherence tomography system with bright field optical beam collection according to the present teaching.

FIG. 1 illustrates a spectral domain optical coherence tomography (OCT) system 100 with bright field optical beam collection according to the present teaching. The OCT system 100 includes a broadband light source 102 that generates broadband light for applications, such as inspection. Numerous broadband light sources can be used in the apparatus of the present teaching. For example, the broadband light source 102 can be a laser driven light source, a superluminescent diode, a supercontinuum broadband light source, and/or a short-pulse laser. In particular, a suitable short pulse light source is a titanium-sapphire laser that emits red and near-infrared light in the range from 650 to 1100 nanometers. In other configurations, the broadband light source 102 is a light source configured to generate at least some light in the ultraviolet region having a wavelength that is less than 400 nm or even less than 300 nm. In other configurations, the broadband light source 102 generates at least some light in a visible region of the spectrum. In other configurations, the broadband light source 102 generates at least some light in a near-infrared region of the spectrum. In yet other configurations, the broadband light source 102 generates at least some light in each of the ultraviolet, visible, and near-infrared regions of the spectrum.

Illumination optics 104, 112 are optically coupled to the broadband light source 102. For example, the illumination optics 104, 112 can be as simple as a collimating lens that projects and collimates, or nominally collimates, the generated broadband light into a collimated beam 106 that is directed to a sample 108, which can be living tissue to be analyzed or an object to be inspected. In one particular application, the surface of the sample 108 being inspected is polished and the OCT system is used for subsurface inspect. In one particular embodiment, the illumination optics 104, 112 is an ellipsoidal mirror that includes two focal points or a pair of off-axis parabolic mirrors as described in more detailed herein.

A beam splitter/combiner 110 is positioned in the path of the collimated beam 106 so as to provide interferometric combining. In various embodiments, the beam splitter/combiner 110 can be an optical fiber combiner, a Y-fiber combiner, a 2×2 fiber combiner, a free space combiner, or an optical circulator. A first portion 106' of the collimated beam 106 propagates towards the sample 108. In some configurations, focusing optics 112, such as the objective lens shown in FIG. 1, is used to focus the first portion 106' of the collimated beam 106 to the sample 108. In some configurations, the illumination optics 104 and the focusing optics 112 comprise at least one common optical element.

Broadband light in the first portion 106' of the collimated beam 106 is scattered from within the sample 108 in a direction that is normal to the top surface of the sample 108 and is also reflected from a top surface of the sample 108 in a direction that is normal to the surface of the sample 108. The combined scattered and reflected light forms a sample beam 114 that propagates back towards the beam splitter/combiner 110.

The beam splitter/combiner 110 directs a second portion 106" of the collimated beam 106 towards a reference mirror 116 that reflects the second portion 106" of the collimated beam 106 back to the beam splitter/combiner 110 to form a reference beam 118. The position of the reference mirror 116 is adjustable so that the reference mirror 116 translates back-and-forth in the direction of propagation of the reference beam 118. The reference mirror 116 is positioned to create a desired length of a reference path, which is the path the reference beam 118 follows from the beam splitter/combiner 110 to the reference mirror 116 and back to the beam splitter/combiner 110. In some embodiments, the reference mirror 116 is configured such that the reflection from the reference mirror 116 results in the reference beam 118 having a low numerical aperture.

The reference beam 118 and the sample beam 114 are interferometrically combined at the beam splitter/combiner 110. In some optical configurations, the illumination optics 104 and the focusing optics 112 are configured so that a difference between a position of the sample beam 114 and a position of the reference beam 118 at a surface of the sample 108 is less than 10 micrometers.

The beam splitter/combiner 110 then directs the interferometrically combined reference beam 118 and sample beam 114 to coupling or collection optics 120, which in the configuration shown in FIG. 1 is a lens such as an objective lens that focuses the interferometrically combined reference beam 118 and sample beam 114 to the input of a spectrometer 122. In particular embodiments, the collection optics 120 is an ellipsoidal mirror with two focal points or a pair of off-axis parabolic mirrors as described in further detail herein. In various embodiments, the optical path from the collection optics 120 to the spectrometer 122 can be a path that propagates in a single mode fiber or a path that propagates in free space, or both.

The interferometrically combined reference beam 118 and sample beam 114 generate interference fringes across the phase front of the resulting combined beam. These fringes can be imaged, or otherwise projected and/or shaped by various output optics. The spectrometer 122 processes the interferometrically combined reference beam 118 and sample beam 114 to generate spectral interferometric information related to features on the surface of the sample 108 and features within the sample 108.

A processor 124 is electrically coupled to the spectrometer 120. The processor 124 processes the spectral interferometric information related to features on the surface and features below the surface of the sample 108 that are generated by the spectrometer 122 to obtain image or image information about these features. For example, the processor 124 can processes the spectral interferometric information generated by the spectrometer to determine precise defect locations in the sample 108 in three dimensions. The processor 124 can also determine defect densities in the sample 108.

One aspect of the present teaching is spectral domain optical coherence tomography system that collects light in the bright field but does not propagate light through dispersive media other than air. This can be achieved in part by using ellipsoidal illumination optics such as optics including an ellipsoidal mirror that includes two focal points.

Figure 2:
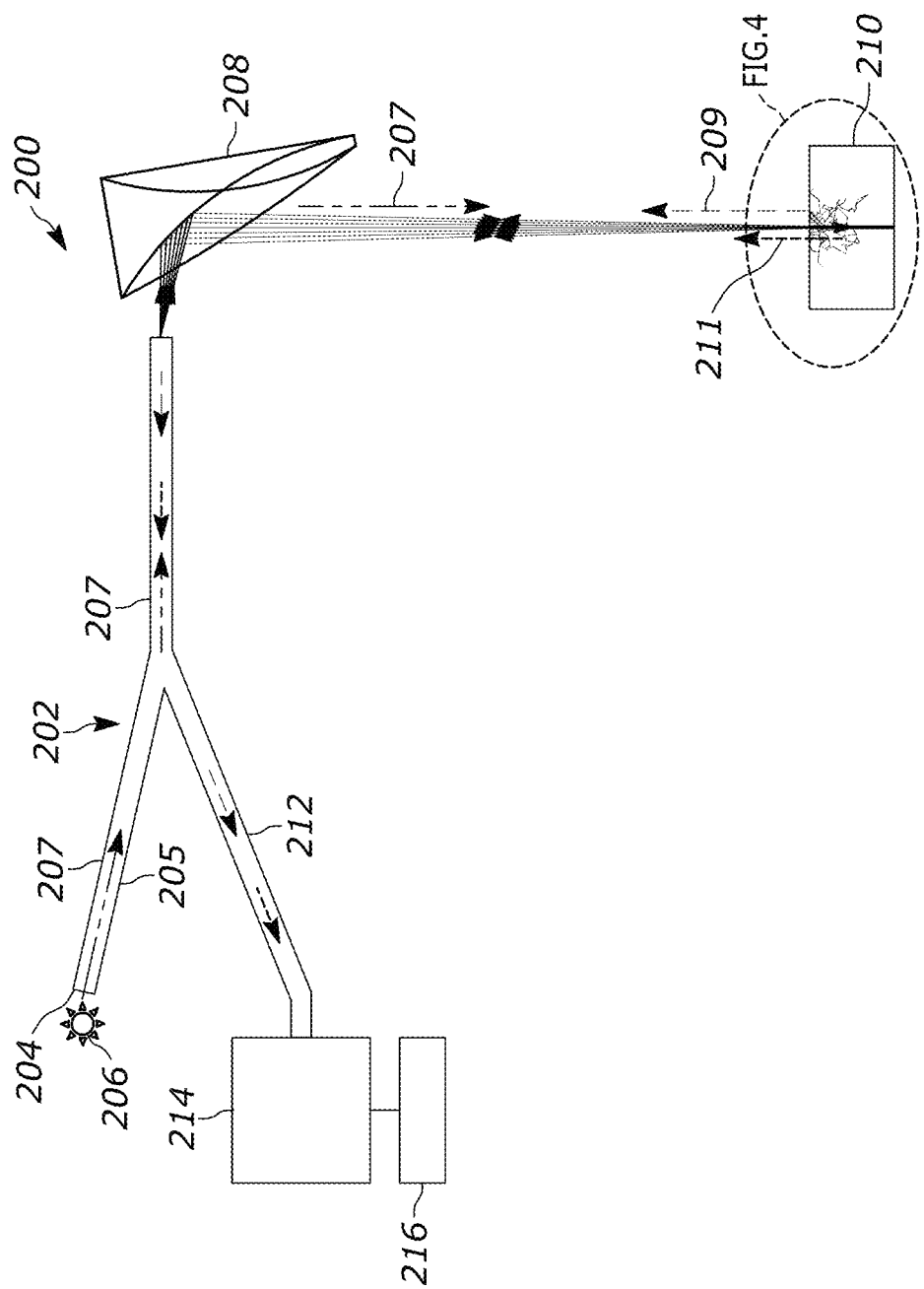
FIG. 2 illustrates a spectral domain optical coherence tomography system according to the present teaching that uses ellipsoidal illumination optics with bright field optical beam collection.

FIG. 2 illustrates a spectral domain optical coherence tomography system 200 according to the present teaching that uses ellipsoidal illumination optics with bright field optical beam collection. Referring to both FIG. 1 and FIG. 2, in this configuration, the collection optics 104 and reference mirror 116 shown in FIG. 1 are combined in the ellipsoidal mirror 208.

In the embodiment shown, a Y-fiber coupler 202 includes an input 204 at a first arm 205 that is optically coupled to a light source 206 that generates an illumination beam 207. The ellipsoidal illumination optics comprises an ellipsoidal mirror 208 that is configured in a shape that provides two focal points. The output of the Y-fiber coupler 202 directs the illumination beam 207 to a first focal point on the ellipsoidal mirror 208. The ellipsoidal mirror 208 directs the illumination beam 207 to a sample 210 that is under measurement and/or inspection. The sample 210 reflects a portion of the illumination beam 207 from the top surface of the sample 210 to form a reference beam 209. The sample also scatters another portion of the sample beam 207 from within the sample 210 to form a scattered beam 211. Light in the illumination beam 207 co-propagates (in an opposite direction) with light in the reference beam 209 and with light in the scattered beam 211 in a single optical path that may have an offset.

The reference beam 209 and the scattered beam 211 co-propagate in the same direction back to a second focal point of the ellipsoidal mirror 208. The ellipsoidal mirror 208 interferometrically combines the reference beam 209 and the scattered beam 211 and then reflects the combined beam back to the output of the Y-fiber coupler 202 and then to an input of the second arm 212 of the Y-fiber coupler 202.

The output of the second arm of the Y-fiber coupler 202 is coupled to a spectrometer 214 that generates interference fringes across the phase front of the resulting combined beam. These fringes can be imaged, or otherwise projected and/or shaped by various output optics. The spectrometer 214 processes the interferometrically combined reference beam 209 and scattered beam 211 to generate spectral interferometric information related to features on the surface and features within the sample 210.

A processor 216 is electrically coupled to the spectrometer 214. The processor 216 processes the spectral interferometric information related to features on the surface and features below the surface of the sample 210 that are generated by the spectrometer 214 to obtain image or image information about these features. For example, the processor 216 can processes the spectral interferometric information generated by the spectrometer 214 to determine precise defect locations in the sample 210 in three dimensions. The processor 216 can also determine defect densities in the sample 210.

Features of this bright field optical configuration of the optical coherence tomography system of the present teaching include the ability to generate a high quality broadband light illuminating sample beam. Also, this bright field optical configuration provides a reference beam and scattered beam with a relatively low numerical aperture. Also, the bright field optical configuration has relatively high optical efficiency and relatively low optical dispersion. In addition, since the broadband light sample beam, reference beam, and scattered beam have overlapping paths, this optical configuration has relatively low noise and relatively low generation of ghost signal from the various interfaces. Furthermore, this bright field optical configuration is resistant to environmental vibration and turbulence.

In one specific application of the optical coherence tomography system of the present teaching, the optical coherence tomography system detects and/or evaluates subsurface defects caused by polish damage in precision optics. Having such information on subsurface defects can drastically reduce polishing costs especially for relatively large precision optics as subsurface defects are known to cause back-scattering of light signals that can substantially impact the optical performance and, can even make the precision optics unusable for its intended purpose. Such information greatly reduces testing costs and time and adds very substantially to the manufacturability of these precision optics.

Figure 3:
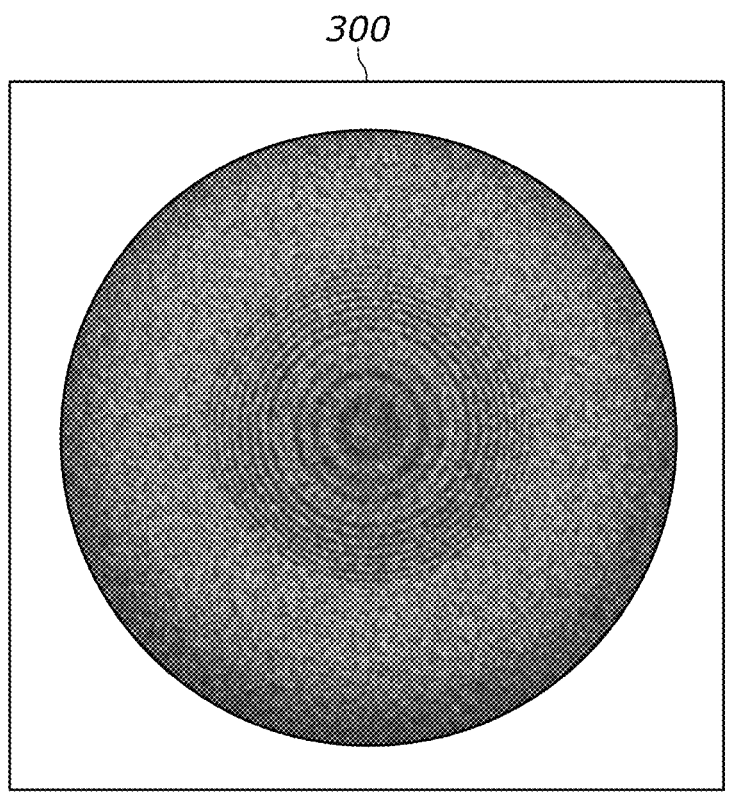
FIG. 3 shows an image of interference fringes of an interferometrically combined reference beam and scattered beam generated by the optical coherence tomography system described in connection with FIG. 2.

FIG. 3 shows an image 300 of interference fringes of an interferometrically combined reference beam and scattered beam generated by the optical coherence tomography system described in connection with FIG. 2. The image shows scattering across the phase front which indicates details of defects below the surface of the sample 210.

Figure 4:
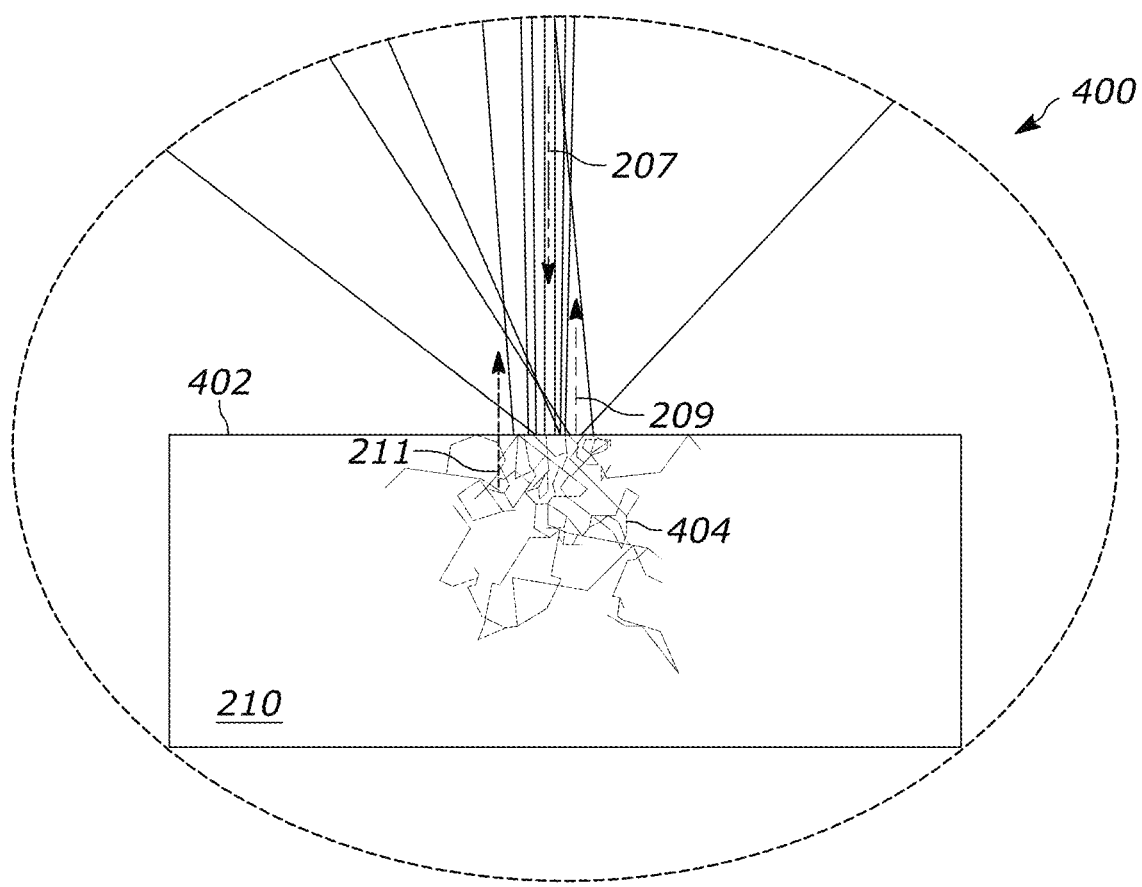
FIG. 4 illustrates a diagram showing the sample beam generating the reference beam and scattered beam in the sample using the spectral domain optical coherence tomography system described in connection with FIG. 2.

FIG. 4 illustrates a diagram 400 showing the sample beam 207 generating the reference beam 209 and scattered beam 211 in the sample 210 using the spectral domain optical coherence tomography system 200 described in connection with FIG. 2. The sample beam 207 propagates to the surface of the sample 210, which is shown as an air/substrate interface 402. The reference beam 209 reflects from the air/substrate interface 402 of the substrate 210 at the interface 402. Defects 404 within the sample 210 scatter the sample beam 207, thereby generating a beam that propagates out of the air/substrate interface 402 of the sample 210 thereby forming the scattered beam 211.

Another feature of the optical coherence tomography system of the present teaching is the realization that the optical coherence tomography systems configured for subsurface defect inspection using broadband light is also compatible with a dark field optical beam collection configuration.

One challenge with embodiments using a dark field optical configuration is obtaining an optically efficient and high quality illumination sample beam at the sample under inspection. Dark field optical systems typically have illumination beams with high numerical apertures that have relatively low optical power efficiency. In addition, dark field optical systems can have higher noise and optical impairments because ghost signals can be generated. Furthermore, the illumination optical beam input angle when it reaches the sample surface can be tilted with respect to a normal to the sample's surface, which can further reduce the optical efficiency of the dark field optics.

In addition, dark field optical configuration can have more physical optical components than similar bright field configurations. These components include beam splitters, optical beam directing components, and optical beam shaping components. These additional optical components have optical interfaces for the illumination sample beam, reference beam and scattered beam to propagate through and/or reflect from. Consequently, there can be significant losses, back reflections, and/or phase front distortions associated with each interface that can impact the optical performance of the system.

Also, in some dark field optical configurations, the magnitude of the reflections from the surface of the sample back to the spectrometer, or other measurement equipment, can be lower than in similar bright field optical configurations. The lower reflections occur despite having an illumination beam that can have a relatively high numerical aperture. This is, at least in part, because the sample and reference beams often have a low numerical aperture compared with bright field configuration.

At the same time, however, there are certain advantages of dark field optical configurations compared with the bright field optical configurations of the present teaching for applications such as subsurface defect inspection. Dark field imaging according to the present teaching is achieved with two additional reflections compared with bright field configurations according to the present teaching. As a result, as described further herein, no reflections from the surface of the sample propagate to into collection optics. In particular, specular reflections are avoided with this configuration. Chromatic aberrations are also reduced. In addition, dark field optical configurations are advantageous in that they can have much higher contrast.

Figure 5:
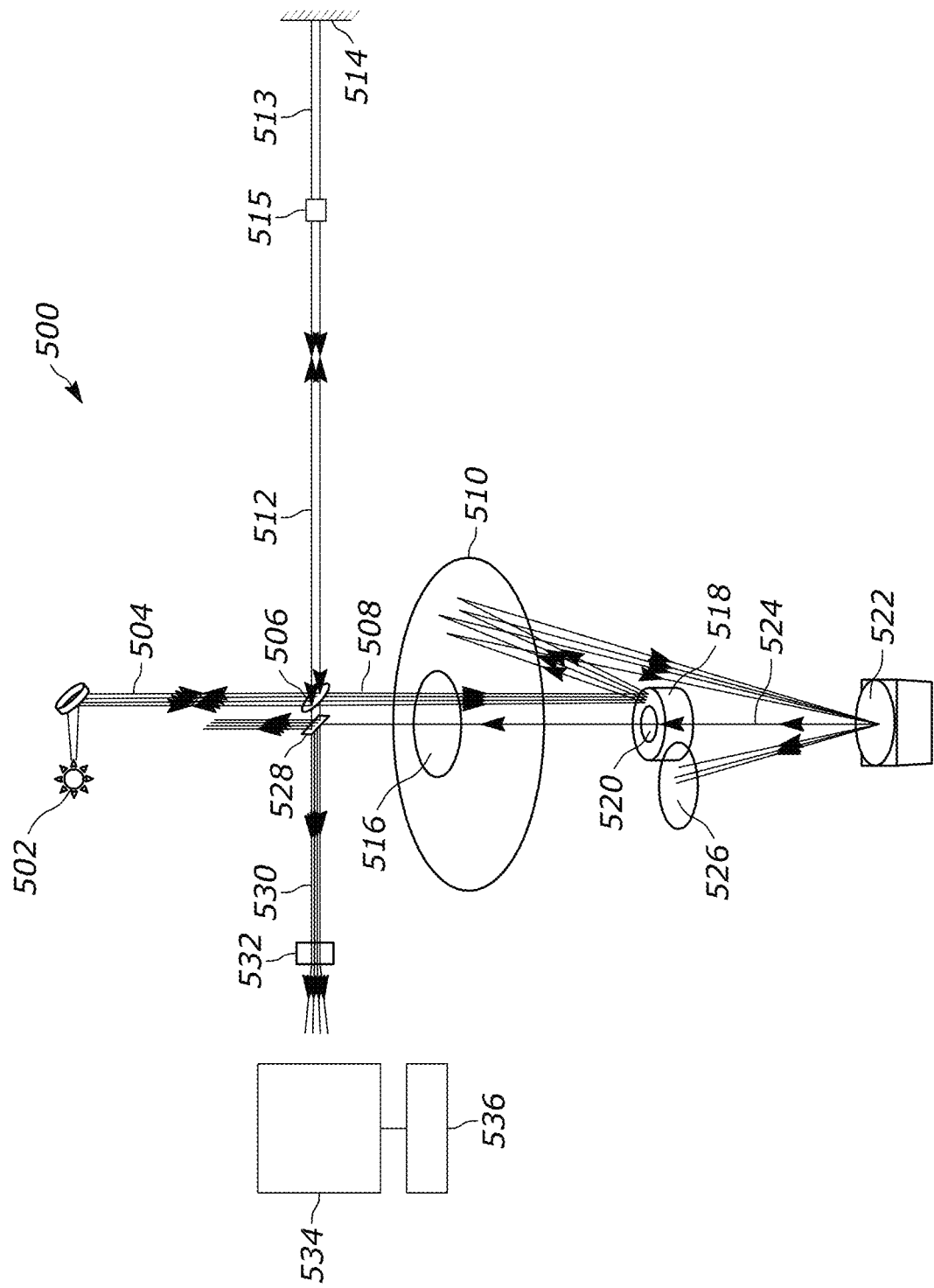
FIG. 5 illustrates a spectral domain optical coherence tomography system with dark field optical beam collection according to the present teaching.

FIG. 5 illustrates a spectral domain optical coherence tomography system 500 with dark field optical beam collection according to the present teaching. A broadband light source 502 generates an optical illumination beam 504. Numerous broadband light sources can be used in the apparatus of the present teaching. For example, the broadband light source 502 can be a laser driven light source, a superluminescent diode, a supercontinuum broadband light source, and/or a short-pulse laser. In particular, a suitable short pulse light source is a titanium-sapphire laser that emits red and near-infrared light in the range from 650 to 1100 nanometers. In other configurations, the broadband light source 502 is a light source configured to generate at least some light in the ultraviolet region having a wavelength that is less than 400 nm or even less than 300 nm. In other configurations, the broadband light source 502 generates at least some light in a visible region of the spectrum. In other configurations, the broadband light source 502 generates at least some light in a near-infrared region of the spectrum. In yet other configurations, the broadband light source 502 generates at least some light in each of the ultraviolet, visible, and near-infrared regions of the spectrum.

The output of the broadband light source 502 is optically coupled to a first beam splitter 506 that passes a first portion of the optical illumination beam 508 to illumination optics 510 and passes a second portion of the optical illumination beam 512 to a reference mirror 514 where it is reflected, thereby forming a reference beam 513. In one embodiment, the first beam splitter 506 is a pellicle beam splitter. Pellicle beam splitters are sometimes advantageous as they have relatively low chromatic aberrations and they substantially eliminate ghosting.

The illumination optics 510 collimates, or nominally collimates, the optical illumination beam 504. In one embodiment of the dark field configuration, the illumination optics 510 includes an off-axis parabolic mirror. In one specific embodiment, the off-axis parabolic mirror is configured with a focal length that is nominally constant over the broad bandwidth of the optical illumination beam 504. Off-axis parabolic mirrors are sometimes desirable because they work efficiently with high-numerical aperture optical beams.

In the optical configuration shown in FIG. 5, the first portion of the optical illumination beam 508 passes through an open or substantially transparent region 516 in the illumination optics 510 to a combination mirror and collection lens 518, which, in this particular embodiment, also has a transparent region 520. The combination mirror and collection lens 518 can be a single optical element or multiple optical elements that collects and projects the second portion of the optical illumination beam 508 to a reflective portion of the illumination optics 510 where the twice reflected second portion of the illumination beam 508 is then directed to the surface of the sample 522 at an input angle that is tilted with respect to a normal to the surface of the sample 522.

A sample beam 524 is generated from light scattered off the sample 522. In some embodiments, the OCT system 500 is configured such that the sample beam 524 has a low numerical aperture. The sample beam 524 is produced by the interaction of the twice reflected first portion of the optical illumination beam 508 and the sample 522 which causes scattering of some light that is generated below the surface of the sample 522 along a scattering beam path. Some of the light is specularly reflected from the sample 522 with an output angle that is equal and opposite to the input angle to the sample 522. This light is scattered in a direction of a beam dump 526, which can be, for example, a beam block or beam trap that substantially absorbs the light.

In the configuration shown, the sample beam 524 is directed to the substantially transparent region 520 in the combination mirror and collection lens 518 and then to a second beam splitter/combiner 528. The second beam splitter/combiner 528 can also be a Pellicle beam splitter which will further reduce ghost imaging. The second portion of the optical illumination beam 512 that is reflected from the reference mirror 514 to form the reference beam 513.

The reference mirror 514 is positioned to create a desired length of a reference path, which is the path the reference beam follows from the first beam splitter 506 to the reference mirror 514 and back to the first beam splitter 506. In some embodiments, a neutral density filter 515, which can be an adjustable neutral density filter, is positioned in the reference path. The reference mirror 514 is typically configured such that the reflection from the reference mirror 514 results in the reference beam 513 having a low numerical aperture.

The reference beam 513 propagates through the first beam splitter 506 to the second beam splitter 528 where it is combined with sample beam 524 to form an interferometrically combined beam 530. The interferometrically combined beam 530 has interference fringes across its phase front.

Output optics 532 projects and/or shapes the interferometrically combined beam 530 to an input of an optical spectrometer 534. As described in connection with the OCT system of FIG. 1, the spectrometer generates spectral interferometric information from the fringes. A processor 536 that is electrically connected to the spectrometer 534 processes the spectral interferometric information to determine information about the sample 534.

One feature of the dark field optical beam collection configuration for optical coherence tomography systems according to the present teaching is that it is possible to perform level matching and/or balancing of signals using an adjustable neutral density filter, such as the filter 515 positioned within the reference arm. This adjustable neutral density filter can be configured to improve and even provide maximal interference resolution.

Another feature of the dark field optical beam collection configuration for optical coherence tomography systems according to the present teaching is that at least one of the first and second beam splitters 506, 528 can be pellicle beam splitters that direct and/or combine the illumination beam 508, reference beam 513 and/or sample beam 524. Pellicle beam splitters can have little to no chromatic aberration when processing focused beams. Consequently, the use of pellicle beam splitters can reduce or eliminate ghost imaging from beam splitter surfaces. Also, pellicle beam splitters can lead to minimal change in optical path length from input to output between the illumination beam path, sample beam path, and reference beam path.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. An optical coherence tomography (OCT) system comprising:
    a) a broadband light source that generates broadband light at an output;
    b) illumination optics optically coupled to the output of the broadband light source and positioned in a path of the generated broadband light, the illumination optics configured to project the generated broadband light to a sample positioned so that at least some of the projected generated broadband light is scattered from within the sample in a direction that is normal to a surface of the sample to form a sample beam and at least some of the projected generated broadband light is reflected from a top surface of the sample in a direction that is normal to the surface of the sample to form a reference beam;
    c) collection optics positioned to collect light in the sample beam and in the reference beam, and is configured to project the collected light to an interferometric combiner,
        wherein the illumination optics and the collection optics together form reflective optics where light in the illumination beam counter-propagates with light in the reference and sample beams without transmission through dispersive optical elements, thereby reducing the OCT system dispersion and chromatic aberration;
    d) an interferometric combiner configured to interferometrically combine the collected light in the sample beam and in the reference beam and to project the interferometrically combined light to an output;
    e) a spectrometer having an input coupled to the output of the interferometric combiner, the spectrometer configured to receive the interferometrically combined light in the sample beam and in the reference beam and to generate spectral interferometric information from the interferometrically combined light in the sample beam and in the reference beam; and
    f) a processor having an input coupled to an output of the spectrometer, the processor processing the spectral interferometric information to determine information about the sample.

2. The optical coherence tomography system of claim 1 wherein the broadband light source comprises a laser driven light source.

3. The optical coherence tomography system of claim 1 wherein the broadband light source comprises a superluminescent diode.

4. The optical coherence tomography system of claim 1 wherein the broadband light source comprises a supercontinuum broadband light source.

5. The optical coherence tomography system of claim 1 wherein the broadband light source comprises a short-pulse laser.

6. The optical coherence tomography system of claim 1 wherein the broadband light source generates at least some light having a wavelength that is less than 400 nm.

7. The optical coherence tomography system of claim 1 wherein the broadband light source generates at least some light having a wavelength that is less than 300 nm.

8. The optical coherence tomography system of claim 1 wherein the broadband light source generates at least some light in a visible region of the spectrum.

9. The optical coherence tomography system of claim 1 wherein the broadband light source generates at least some light in a near-infrared region of the spectrum.

10. The optical coherence tomography system of claim 1 wherein the broadband light source generates at least some light having wavelengths in an ultraviolet, a visible and a near-infrared region of the spectrum.

11. The optical coherence tomography system of claim 1 wherein the illumination optics is configured to project the generated broadband light to a sample with a polished surface.

12. The optical coherence tomography system of claim 1 wherein the illumination optics and the collection optics forming reflective imaging optics comprise at least some common optical elements.

13. The optical coherence tomography system of claim 1 wherein the illumination optics comprise an ellipsoidal mirror.

14. The optical coherence tomography system of claim 1 wherein the collection optics comprise an ellipsoidal mirror.

15. The optical coherence tomography system of claim 1 wherein the reflective imaging optics comprise an ellipsoidal mirror.

16. The optical coherence tomography system of claim 1 wherein the illumination optics comprise a pair of off-axis parabolic mirrors.

17. The optical coherence tomography system of claim 1 wherein the collection optics comprise a pair of off-axis parabolic mirrors.

18. The optical coherence tomography system of claim 1 wherein the reflective imaging optics comprise a pair of off-axis parabolic mirrors.

19. The optical coherence tomography system of claim 1 wherein the illumination optics comprise an objective lens.

20. The optical coherence tomography system of claim 1 wherein the collection optics comprise an objective lens.

21. The optical coherence tomography system of claim 1 wherein the reflective imaging optics comprise an objective lens.

22. The optical coherence tomography system of claim 1 wherein the processor is configured to process the spectral interferometric information to determine defect locations in the sample.

23. The optical coherence tomography system of claim 1 wherein the processor is configured to process the spectral interferometric information to determine a defect density in the sample.

24. The optical coherence tomography system of claim 1 wherein the illumination optics is configured so that a difference between a position of the sample beam and a position of the reference beam at a surface of the sample is less than 10 micrometers.

25. The optical coherence tomography system of claim 1 wherein the interferometric combiner comprises an optical fiber combiner.

26. The optical coherence tomography system of claim 1 wherein the interferometric combiner comprises a Y-fiber combiner.

27. The optical coherence tomography system of claim 1 wherein the interferometric combiner comprises a 2×2 fiber combiner.

28. The optical coherence tomography system of claim 1 wherein the interferometric combiner comprises a free space combiner.

29. The optical coherence tomography system of claim 1 wherein the interferometric combiner comprises an optical circulator.

* * * * *